US 8,606,424 B2

(12) United States Patent
Abido et al.

(10) Patent No.: US 8,606,424 B2
(45) Date of Patent: Dec. 10, 2013

(54) PARTICLE SWARM OPTIMIZATION SYSTEM AND METHOD FOR MICROGRIDS

(75) Inventors: Mohammad Ali Yousef Abido, Dhahran (SA); Mohammad Ali Ali Hassan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 399 days.

(21) Appl. No.: 13/080,423

(22) Filed: Apr. 5, 2011

(65) Prior Publication Data

US 2012/0259477 A1    Oct. 11, 2012

(51) Int. Cl.
G05B 13/02    (2006.01)
G05D 17/00    (2006.01)

(52) U.S. Cl.
USPC ............... 700/297; 700/28; 700/32; 700/295

(58) Field of Classification Search
USPC .......................................................... 700/297
See application file for complete search history.

(56) References Cited

U.S. PATENT DOCUMENTS

| | | | | |
|---|---|---|---|---|
| 3,571,742 | A | * | 3/1971 | Wengenroth .................... 330/54 |
| 4,506,236 | A | * | 3/1985 | Cloke ............................. 333/19 |
| 5,712,795 | A | * | 1/1998 | Layman et al. ................ 700/297 |
| 6,819,087 | B2 | * | 11/2004 | Delmerico et al. ............. 322/58 |
| 7,752,150 | B2 | | 7/2010 | Ye et al. |
| 7,983,799 | B2 | * | 7/2011 | Bose et al. .................... 700/297 |
| 2002/0034447 | A1 | * | 3/2002 | Brazil et al. .................. 417/279 |
| 2002/0036430 | A1 | * | 3/2002 | Welches et al. ................ 307/18 |
| 2004/0051387 | A1 | * | 3/2004 | Lasseter et al. ................ 307/80 |
| 2004/0124812 | A1 | * | 7/2004 | Delmerico et al. ............. 322/29 |
| 2004/0230926 | A1 | * | 11/2004 | Berry et al. ...................... 716/5 |
| 2005/0212510 | A1 | * | 9/2005 | Kirchdoerffer et al. .. 324/207.15 |
| 2009/0177333 | A1 | * | 7/2009 | Delmerico et al. ............ 700/297 |
| 2009/0326725 | A1 | * | 12/2009 | Carlson et al. ............... 700/291 |
| 2010/0127576 | A1 | * | 5/2010 | Ahlborn et al. ............... 307/151 |
| 2010/0185336 | A1 | | 7/2010 | Rovnyak et al. |

OTHER PUBLICATIONS

Hassan et al., "Optimal Autonomous Control of an Inverter-Based Microgrid Using Particle Swarm Optimization", IEEE, Jul. 4-7, 2010, pp. 2247-2252.*
Hassan et al., "Optimal Design of Mircrogrids in Autonomous and Grid-Connected Modes Using Particle Swarm Optimization", IEEE, Mar. 3, 2011, p. 755-769.*
Zeineldin et al., "Protective Relay Coordination for Micro-grid Opeation Using Particle Swarm Optimization" IEEE, 2006, p. 152-157.*
A. G. Madureira and J. A. Peças Lopes, Voltage and Reactive Power Control in MV Networks integrating MicroGrids, International Conference on Renewable Energies and Power Quality (ICREPQ'07) (2007), 5 pages.

(Continued)

*Primary Examiner* — Kavita Padmanabhan
*Assistant Examiner* — Thomas Stevens
(74) *Attorney, Agent, or Firm* — Richard C. Litman

(57) ABSTRACT

The particle swarm optimization method for microgrids formulates a control problem as an optimization problem and PSO is used to search the solution space for optimal parameter settings in each mode. The procedure models optimal design of an LC filter, controller parameters and damping resistance in grid-connected mode. Moreover, the procedure optimizes controller parameters and power sharing coefficients in autonomous mode. The method uses particular non-linear time-domain-based and eigenvalue-based objective functions to minimize the error in the measured power, and also to enhance the damping characteristics, respectively.

11 Claims, 33 Drawing Sheets

(56) References Cited

OTHER PUBLICATIONS

Il-Yop Chung, W. Liu, D. Cartes, E. Collins and S. Moon, "Control methods of inverter-interfaced distributed generators in a microgrid system," IEEE Transactions on Industry Applications, vol. 46, No. 3, pp. 1078-1088, May/Jun. 2010.

Il-Yop Chung et al., "Control parameter Optimization for a Microgrid System Using Partcle Swarm Optimization," IEEE Conference on Sustainable Energy Technologies, ICSET 2008, pp. 837-842.

* cited by examiner

PARTICLE SWARM OPTIMIZATION SYSTEM AND METHOD FOR MICROGRIDS

BACKGROUND OF THE INVENTION

1. Field of the Invention

The present invention relates to power generation facilities, and particularly to a particle swarm optimization system and method for microgrids.

2. Description of the Related Art

Power system construction has changed in the last two decades due to a lot of challenges, such as load growth, new environmental policy with a demand to reduce $CO_2$ emissions, and marketplace economic stresses. This has led to increased interest in local connection of renewable energy sources at the distribution level. Microgrids are small electrical distribution systems that connect multiple customers to multiple distributed sources of generation and storage through power electronic inverters, which provide the necessary interface. Microgrids can be operated in both autonomous and grid-connected modes. There exists a requirement to control the microgrid in both autonomous and grid-connected mode. Thus, microgrid control in both modes has been investigated recently. Control issues include keeping bus voltages within specified limits; controlling transformer, line and feeder loading; minimizing active power losses; managing reactive power sources; and controlling the power factor.

A microgrid power system is a local scale power system that uses microsource generation scaled either by electrical or thermal output to the local system demand. It can serve a customer with multiple load locations, an industrial park, or a campus. It is designed to transfer seamlessly between connection with the local utility and isolated operation. It provides power reliability and power quality benefits not available from the conventional utility grid system. Moreover, it incorporates communication/aggregation features to allow organization and control of the microgrid power system as a single entity.

The dynamic nature of the distribution network of a microgrid challenges the stability and control effectiveness of the microgrids in both grid-connected and autonomous modes. In the grid-connected mode, control of the inverter is required to make the microgrid capable of regulating the active and reactive output currents, ensuring high power quality levels, and achieving relative immunity to grid perturbations. In the autonomous mode, the inverter is controlled to feed the load with the pre-defined voltage and frequency values according to a specific control strategy.

Generally, two control loops are used in the autonomous mode. The inner loop includes voltage and current PI controllers, which are designed to reject high frequency disturbances and damp the output filter to avoid resonance with the external network. The outer power loop is based on well-known droop control to share the fundamental real and reactive powers with other microgrid sources. In droop control, the inverter emulates the behavior of a synchronous machine. The power angled $\delta$ depends mainly on real power P, while the voltage depends mainly on reactive power Q. In other words, the angle $\delta$ can be controlled by regulating P, while the output inverter voltage can be controlled through Q. Control of frequency dynamically controls the power angle, and thus the real power flow.

Therefore, by adjusting P and Q independently, frequency and voltage amplitude of the microgrid can be determined. The stability of the microgrids operating in either mode is quite essential, and is affected by different parameters. In the autonomous mode, stability can be affected by controller parameters, as well as by power sharing coefficients. In the grid-connected mode, controller parameters and filter parameters are the key factors of microgrid stability.

Generally, careful selection of the controller, filter, and power sharing parameters maintains power quality within the regulated range and enhances system performance against load changes and disturbances. Different approaches to select the controller parameters and control strategies have been reported in the literature, where a trial and error approach has been adopted. This approach is time-consuming, and there is no guarantee that the adopted settings are the optimal ones. In addition, it does not provide a systematic procedure to solve the controller design problem.

Recently, computational intelligence algorithms, such as the genetic algorithm (GA) and the particle swarm optimization (PSO) algorithm have been applied to different power system problems with impressive success. However, some deficiencies in GA performance, such as premature convergence, have been recorded. On the other hand, PSO has been widely implemented and stamped as one of the promising optimization techniques due its simplicity, computational efficiency, and robustness. Generally, PSO has been motivated by the behavior of organisms, such as fish schools and bird flocks. It combines social psychology principles in socio-cognition human agents and evolutionary computations. Unlike the other heuristic techniques, PSO has a flexible and well-balanced mechanism to enhance global and local exploration abilities.

Although microgrid planning and operation have several challenging problems, such as size, location, and optimal design of different controllers, the application of PSO to solve these problems is still in its early stage. Optimal size and location problem of the distributed generation unit (DG) has been addressed for maximizing the economic benefits and minimizing the line loss. PSO has also been also employed to obtain controller parameters and power sharing coefficients in both modes. However, the LC filter design and coupling inductance have not been taken into consideration. It is worth mentioning that microgrid stability is strongly affected also by the filter parameters. While a PSO algorithm has been applied directly to a power-electronic-switch-level microgrid simulation model instead of small-signal models, the aforementioned method needs external software to simulate the system and calculate the objective function.

Thus, a particle swarm optimization system and method for microgrids solving the aforementioned problems is desired.

SUMMARY OF THE INVENTION

The particle swarm optimization system and method for microgrids optimizes microgrids operating in different modes utilizing linear and nonlinear models. The method utilizes a single code for modeling, optimization, linearization, and nonlinear time domain simulation. Utilizing a novel technique for stability enhancement of a microgrid operating in both autonomous and grid-connected modes, voltage source inverter (VSI), LC filter, coupling inductance, phase-locked loop (PLL), lines, loads, and power, current, and voltage controllers are modeled. The design problem of different microgrid components and controller parameters is formulated as an optimization problem where particle swarm optimization (PSO) is employed to solve the design problem. Eigenvalue-based and nonlinear time domain simulation-based objective functions are considered with the aim of microgrid stability enhancement in the grid-connected mode, where the controller parameters, LC filter components, and damping resistance are optimized. On the other hand, nonlinear time domain simulation-based objective functions are considered with the aim of autonomous microgrid stability enhancement, where the controller parameters and the power sharing coefficients are optimized. The performance of the microgrid with the controllers and optimal settings under different disturbances has been examined through eigenvalue analysis and nonlinear time domain simulations. The results show the effectiveness of the method to enhance the stability of the microgrid being considered. Moreover, the robustness of the PSO method has been demonstrated.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
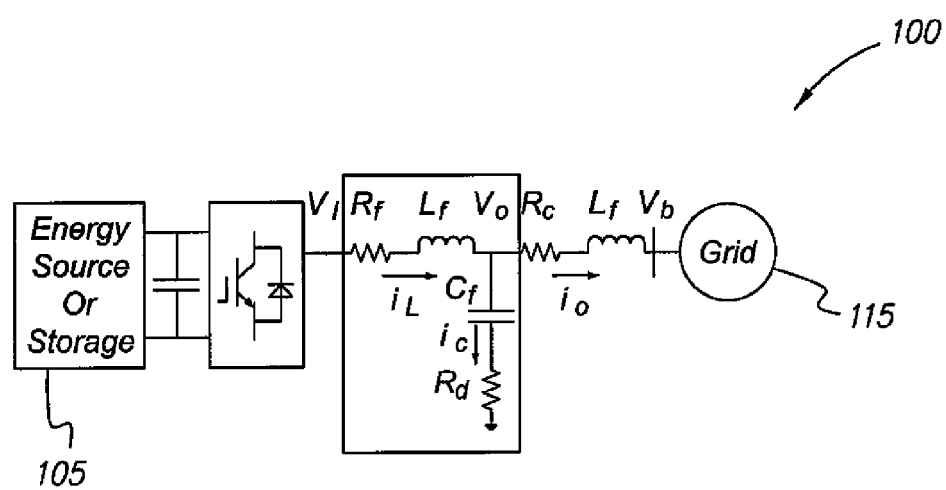
FIG. 1 is a block diagram of a microgrid operating in grid-connected mode.

The particle swarm optimization method for microgrids, described generally in the steps of the flowchart 1300 of FIG.

13, utilizes linear and nonlinear models operating in different modes. The method utilizes a single program code for modeling, optimization, linearization, and nonlinear time domain simulation. It will be understood that the diagrams in the drawings depicting the particle swarm optimization method for microgrids are exemplary only, and may be embodied in a dedicated electronic device having a microprocessor, microcontroller, digital signal processor, application specific integrated circuit, field programmable gate array, any combination of the aforementioned devices, or other device that combines the functionality of the particle swarm optimization method for microgrids onto a single chip or multiple chips programmed to carry out the method steps described herein, or may be embodied in a general purpose computer having the appropriate peripherals attached thereto and software stored on a computer readable media that can be loaded into main memory and executed by a processing unit to carry out the functionality of the system and steps of the method described herein.

Figure 2:
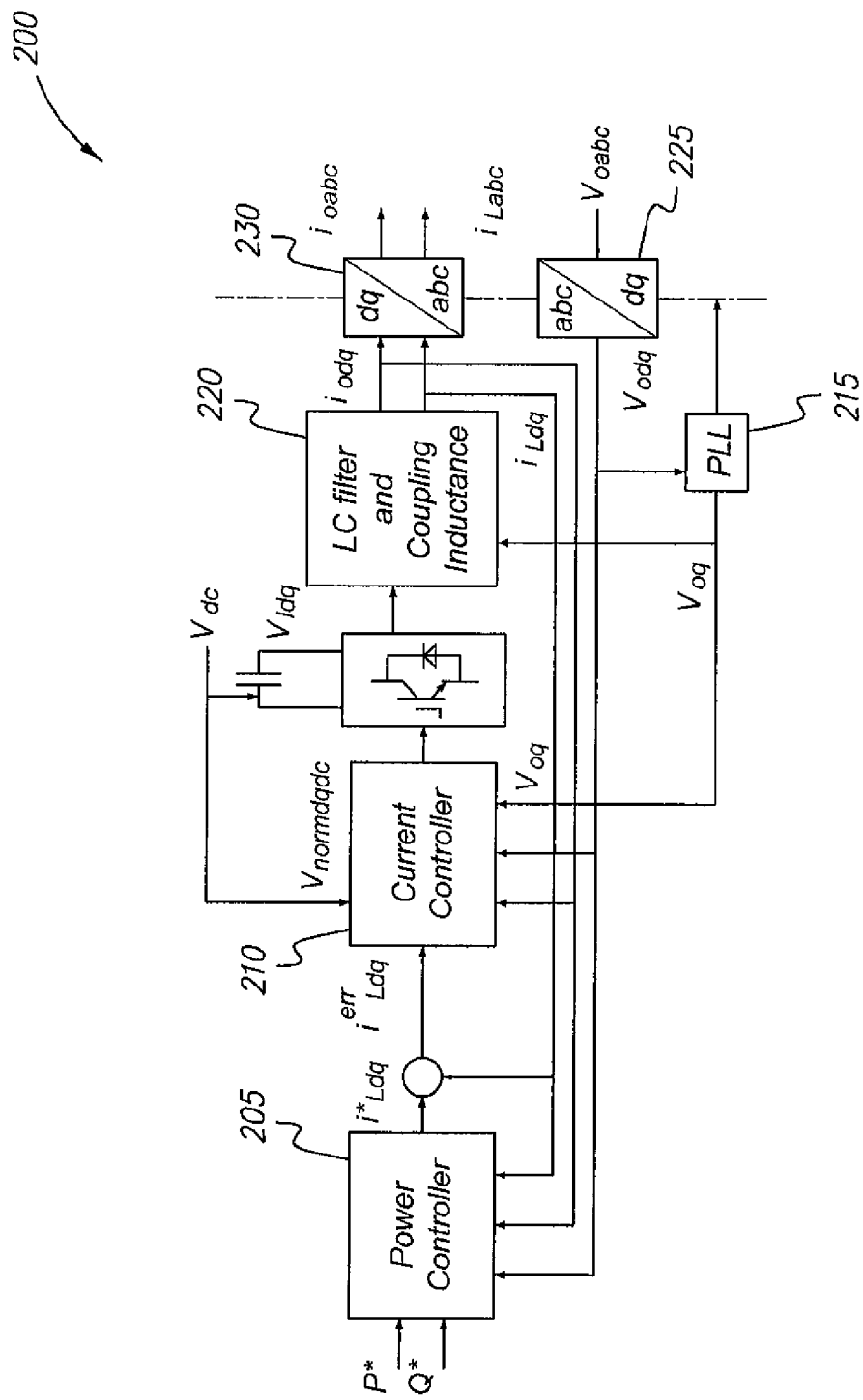
FIG. 2 is a block diagram of a voltage source inverter (VSI) control circuit for a microgrid operating in grid-connected mode in a particle swarm optimization system for microgrids according to the present invention.

Referring to FIGS. 1 and 2, a typical inverter-based grid-connected microgrid 100 is shown, which includes an energy source 105, a power controller 205, a current controller 210, a phase-locked loop PLL circuit 215, and an LC filter and coupling inductance 220 connecting the microgrid 100 to the grid 115. The voltage source inverter (VSI) control circuit 200 of the grid-connected mode is most clearly shown in FIG. 2. The power controller 205 is used to calculate the inductor reference current, which represents the output reference powers. The proportional-integral (PI) current controller 210 is aimed at minimizing the error in the inductor current with respect to its reference value. Since the PI controller 210 is operating effectively on the pseudo-stationary voltages and currents, the current control is performed in a rotational reference frame. PLL 215 is used to provide the reference angle for the rotating frame. The measured voltage at the point of common coupling (PCC) will be transformed to the current 230 and voltage 225 dq values using the transformation matrix as follows:

$$\begin{pmatrix} v_{od} \\ v_{oq} \\ v_{oo} \end{pmatrix} = \sqrt{\frac{2}{3}} \begin{pmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \\ \frac{1}{\sqrt{2}} & \frac{1}{\sqrt{2}} & \frac{1}{\sqrt{2}} \end{pmatrix} \begin{pmatrix} v_{oa} \\ v_{ob} \\ v_{oc} \end{pmatrix} \quad (1)$$

The rotational frame angle, $\theta$, is used to transfer the voltage and currents from the abc reference frame to the dq frame and vice versa. The state-space model of different microgrid components can be written as follows:

$$\dot{x} = Ax + R(x,u) \quad (2)$$

Figure 3:
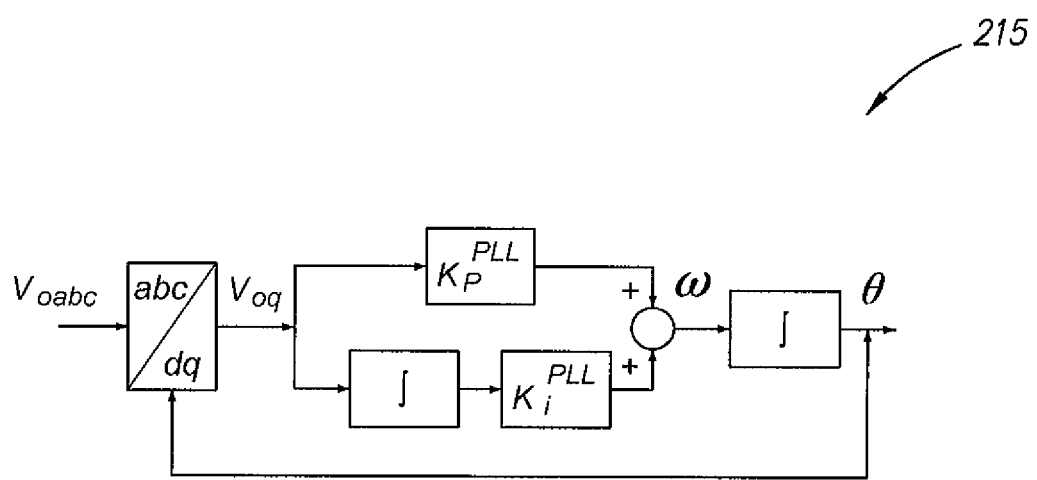
FIG. 3 is a block diagram of a phase locked loop (PLL) model.

The phase-locked loop (PLL) 215, as shown in FIG. 3, is based on aligning the angle of the dq transformation so that the voltage at the connection point has no q-axis component. A PI regulator acts on the alignment error to set the rotation frequency. Then this frequency is used to obtain the transformation angle, $\theta$, as:

$$\omega = k_P^{PLL} v_{oq} + k_I^{PLL} \int v_{oq} dt \quad (3)$$

$$\theta = \int \omega dt \quad (4)$$

Thus, the PLL states are $X_{PLL} = [\theta \, \Phi_{PLL}]$ where $\Phi_{PLL} = \int v_{oq} dt$, and the PLL model can be written as:

$$\dot{x}_{PLL}^* = \begin{bmatrix} 0 & k_I^{PLL} \\ 0 & 0 \end{bmatrix} \begin{bmatrix} 0 \\ \phi_{PLL} \end{bmatrix} + \begin{bmatrix} k_P^{PLL} v_{oq} \\ v_{oq} \end{bmatrix} \quad (5a)$$

The short form of which can be written as:

$$\dot{x}_{PLL} = A_{PLL} x_{PLL} + R_{PLL}(x,u) \quad (5b)$$

The PLL output is $y_{PLL} = [\theta \, V_{od} \, V_{oq}]$.

Figure 4:
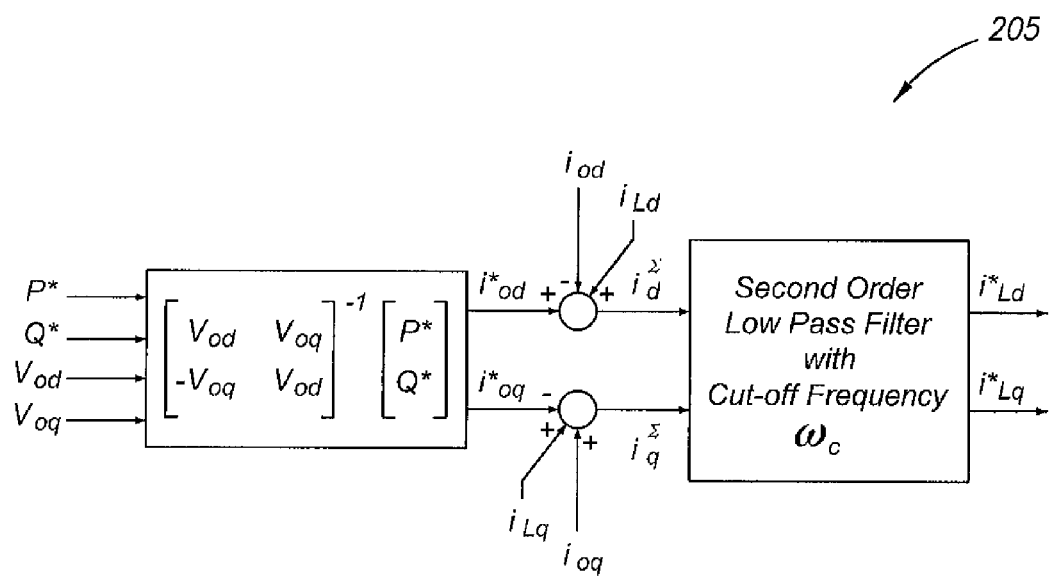
FIG. 4 is a detailed block diagram of a power controller circuit in a particle swarm optimization system for microgrids according to the present invention.

The power controller 205, shown in FIG. 4, is used to calculate the reference currents in three phase (abc) and direct quadrature (dq) forms with the aid of reference active and reactive powers. The output reference currents $i_{od}^*$ and $i_{oq}^*$ are calculated using the reference powers and the output dq-voltages $v_{od}$ and $v_{oq}$ as follows:

$$i_{od}^* = \frac{v_{od} P^* - v_{oq} Q^*}{v_{od}^2 + v_{oq}^2} \quad (6)$$

$$i_{oq}^* = \frac{v_{oq} P^* + v_{od} Q^*}{v_{od}^2 + v_{oq}^2} \quad (7)$$

The reference coupling inductance currents $i_d^\Sigma$ and $i_q^\Sigma$ can be expressed as follows:

$$i_d^\Sigma = i_{od}^* + i_{od} = i_{od}^* + (i_{Ld} - i_{od}) \quad (8)$$

$$i_q^\Sigma = i_{oq}^* + i_{oq} = i_{oq}^* + (i_{Lq} - i_{oq}) \quad (9)$$

A low-pass filter is used to remove the harmonics and noises, which may result from the distortion of the voltage at the point of common coupling (PCC). The current controller references $i_{Ld}^*$ and $i_{Lq}^*$ after filtering are given as:

$$i_{Ld}^* = \frac{\omega_c^2}{s^2 + \sqrt{2} s \omega_c + \omega_c^2} i_d^\Sigma \quad (10)$$

$$i_{Lq}^* = \frac{\omega_c^2}{s^2 + \sqrt{2} s \omega_c + \omega_c^2} i_q^\Sigma \quad (11)$$

where $\omega_c$ is the cut-off frequency of the low-pass filter.

These two equations can be rewritten as follows:

$$\frac{d i_{Ld}^*}{dt} = \omega_c^2 \int (i_d^\Sigma - i_{Ld}^*) dt - \sqrt{2} \, \omega_c i_{LD}^* \quad (12)$$

$$\frac{d i_{Lq}^*}{dt} = \omega_c^2 \int (i_q^\Sigma - i_{Lq}^*) dt - \sqrt{2} \, \omega_c i_{Lq}^* \quad (13)$$

Equations (12) and (13) can be rewritten as follows.

$$\frac{d i_{Ld}^*}{dt} = q_{3d} - \sqrt{2} \, \omega_c i_{Ld}^* \quad (14)$$

$$\frac{d i_{Lq}^*}{dt} = q_{3q} - \sqrt{2} \, \omega_c i_{Lq}^* \quad (15)$$

where $q_{3d} = \int (i_d^\Sigma - i_{Ld}^*) dt$ and $q_{3q} = \int (i_q^\Sigma - i_{Lq}^*) dt$, and the state-space model of the power controller will be as follows:

$$\dot{x}^*_{P\_controller} = \begin{bmatrix} -\sqrt{2}\,\omega_c & 0 & \omega_c^2 & 0 \\ 0 & -\sqrt{2}\,\omega_c & 0 & \omega_c^2 \\ -1 & 0 & 0 & 0 \\ 0 & -1 & 0 & 0 \end{bmatrix} \begin{bmatrix} i^*_{Ld} \\ i^*_{Lq} \\ q_{3d} \\ q_{3q} \end{bmatrix} \ldots + \quad (16)$$

$$\begin{bmatrix} 0 \\ 0 \\ \dfrac{v_{od}P^* - v_{oq}Q^*}{v_{od}^2 + v_{oq}^2} + i_{Ld} - i_{od} \\ \dfrac{v_{oq}P^* + v_{od}Q^*}{v_{od}^2 + v_{oq}^2} + i_{Lq} - i_{oq} \end{bmatrix}$$

The short form is written as:

$$\dot{x}_{P\_controller} = A_{P\_controller} x_{P\_controller} + B_{P\_controller}(x,u)$$

where:

$x_{P\_controller} = [i_{Ld}^* \; i_{Lq}^* \; q_{3d} \; q_{3q}]^T$ is the state vector,
$u_{P\_controller} = [P^* \; Q^* \; v_{od} \; v_{oq} \; i_{Ld} \; i_{Lq} \; i_{od} \; i_{oq}]^T$ is the input vector, and
$y_{P\_controller} = [i_{Ld}^* \; i_{Lq}^*]^T$ is the output vector.

Figure 5:
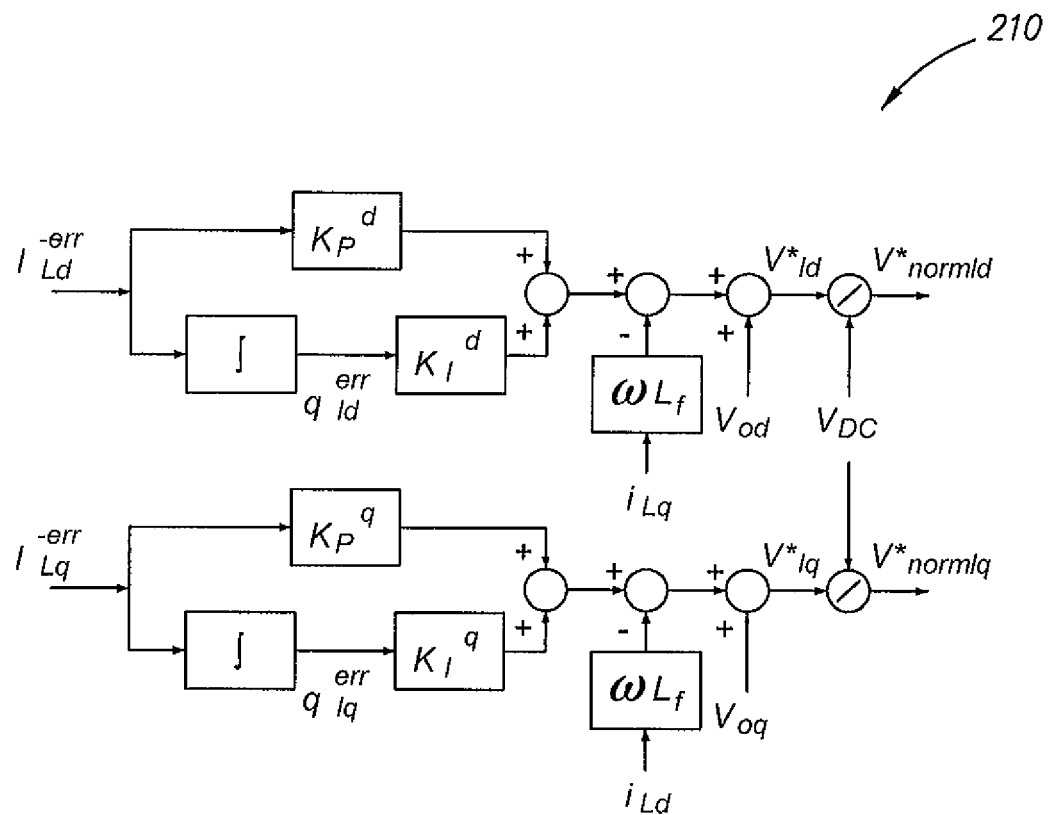
FIG. 5 is a detailed block diagram of a current controller circuit for a microgrid operating in grid-connected mode in a particle swarm optimization system for microgrids according to the present invention.
Figure 6:
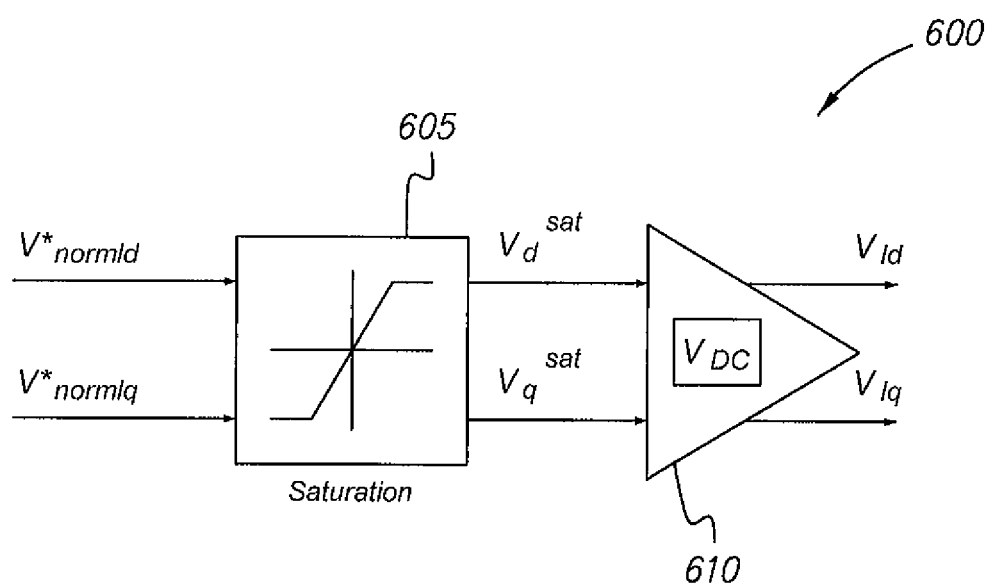
FIG. 6 is a block diagram of an inverter model in a particle swarm optimization system for microgrids according to the present invention.

In grid connection mode, the current controller is essential for power quality improvement. The exemplary PI current controller 210 is shown in FIG. 5. As shown in FIG. 6, the inverter model 600 includes an inverter 610 being coupled to input V*normld and V*normlq via linearized logistic saturation transfer function 605. The voltage signal required by the inverter can be written as:

$$v_{ld}^* = v_{od} - \omega L_f i_{Lq} + k_P^d i_{Ld}^{err} + k_I^d \int i_{Ld}^{err} dt \quad (17)$$

$$v_{lq}^* = v_{oq} + \omega L_f i_{Ld} + k_P^q i_{Lq}^{err} + k_I^q \int i_{Lq}^{err} dt \quad (18)$$

and the state-space model of the current controller is given as follows:

$$\dot{x}^*_{C\_controller} = \begin{bmatrix} 0 & 0 \\ 0 & 0 \end{bmatrix} \begin{bmatrix} q_{ld}^{err} \\ q_{lq}^{err} \end{bmatrix} + \begin{bmatrix} 1 & 0 & 0 & 0 & 0 & 0 \\ 0 & 1 & 0 & 0 & 0 & 0 \end{bmatrix} \begin{bmatrix} i_{Ld}^{err} \\ i_{Lq}^{err} \\ i_{Ld} \\ i_{Lq} \\ v_{od} \\ v_{oq} \end{bmatrix} \quad (19)$$

The short form being:

$$\dot{x}_{C\_controller} = A_{C\_controller} x_{C\_controller} + B_{C\_controller} u_{C\_controller}$$

where $q_{ld}^{err} = \int i_{Ld}^{err} dt$; $q_{lq}^{err} = \int i_{Lq}^{err} dt$
$x_{C\_controller} = [q_{ld}^{err} \; q_{lq}^{err}]^T$ is the state vector, and
$u_{C\_controller} = [i_{Ld}^{err} \; i_{Lq}^{err} \; i_{Ld} \; i_{Lq} \; v_{od} \; v_{oq}]^T$ is the input vector.

The output equation can be written as follows:

$$y_{C\_controller} = \dfrac{1}{V_{DC}} \left( \begin{bmatrix} k_I^d & 0 \\ 0 & k_I^q \end{bmatrix} \begin{bmatrix} q_{ld}^{err} \\ q_{lq}^{err} \end{bmatrix} \ldots + \right. \quad (20)$$

$$\left. \begin{bmatrix} k_P^d & 0 & 0 & 1 & 0 & 0 \\ 0 & k_P^q & 0 & 0 & 1 & 0 \end{bmatrix} \begin{bmatrix} i_{Ld}^{err} \\ i_{Lq}^{err} \\ i_{Ld} \\ i_{Lq} \\ v_{od} \\ v_{oq} \end{bmatrix} \ldots + \begin{bmatrix} -\omega L i_{Lq} \\ \omega L i_{Ld} \end{bmatrix} \right)$$

A passive low-pass filter is used to attenuate switching frequency ripple. The filter has important dynamic effects on the system stability. To avoid the resonance that may arise with coupling or grid inductance, a passive damping circuit is added to the filter, such as damping resistors. Assuming that the inverter input and output voltage are equal, i.e., $v_1 = v_1^*$, the small signal model of the output LC filter and coupling inductance can be represented as:

$$v_{la} = i_{La}R_f + L_f \dfrac{di_{La}}{dt} + v_{Ca} + i_{Ca}R_d \quad (21)$$

$$v_{ba} = -i_{oa}R_c - L_c \dfrac{di_{oa}}{dt} + v_{Ca} + i_{Ca}R_d \quad (22)$$

$$C_f \dfrac{dv_{Ca}}{dt} = i_{La} - i_{oa} \quad (23)$$

In the dq frame, equations (21)-(23) can be rewritten as:

$$\dfrac{di_{Ld}}{dt} = -\dfrac{R_f}{L_f} i_{Ld} - \dfrac{1}{L_f}(v_{cd} - v_{ld}) + \omega i_{Lq} - R_d i_{Cd} \quad (24)$$

$$\dfrac{di_{Lq}}{dt} = -\dfrac{R_f}{L_f} i_{Lq} - \dfrac{1}{L_f}(v_{cd} - v_{ld}) + \omega i_{Ld} - R_d i_{Cq} \quad (25)$$

$$\dfrac{di_{od}}{dt} = -\dfrac{R_f}{L_f} i_{od} - \dfrac{1}{L_c}(v_{cd} - v_{bd}) + \omega i_{oq} - R_d i_{Cd} \quad (26)$$

$$\dfrac{di_{oq}}{dt} = -\dfrac{R_f}{L_f} i_{oq} - \dfrac{1}{L_c}(v_{cq} - v_{bd}) + \omega i_{od} - R_d i_{Cq} \quad (27)$$

$$\dfrac{dv_{Cd}}{dt} = -\dfrac{1}{C_f}(i_{Ld} - i_{od}) + \omega v_{Cq} \quad (28)$$

$$\dfrac{dv_{Cq}}{dt} = \dfrac{1}{C_f}(i_{Lq} - i_{oq}) + \omega v_{Cd} \quad (29)$$

where $L_f$ is the filter inductance, $C_f$ is the filter capacitance, $R_f$ is the filter resistance, $R_d$ is the damping resistance, $L_c$ is the coupling inductance, and $R_c$ is the coupling resistance. The state-space model of the LC filter and coupling inductance can be given as:

$$x_{filter} = \begin{bmatrix} -\frac{R_f}{L_f} & 0 & -\frac{1}{L_f} & 0 & 0 & 0 \\ 0 & -\frac{R_f}{L_f} & 0 & -\frac{1}{L_f} & 0 & 0 \\ \frac{1}{C_f} & 0 & 0 & 0 & -\frac{1}{C_f} & 0 \\ 0 & \frac{1}{C_f} & 0 & 0 & 0 & -\frac{1}{C_f} \\ 0 & 0 & \frac{1}{L_c} & 0 & -\frac{R_c}{L_c} & 0 \\ 0 & 0 & 0 & \frac{1}{L_c} & 0 & -\frac{R_c}{L_c} \end{bmatrix} \quad (30)$$

$$\begin{bmatrix} i_{Ld} \\ i_{Lq} \\ v_{cd} \\ v_{cq} \\ i_{od} \\ i_{oq} \end{bmatrix} \cdots + \begin{bmatrix} \frac{1}{L_f} & 0 & 0 & 0 & 0 \\ 0 & \frac{1}{L_f} & 0 & 0 & 0 \\ 0 & 0 & 0 & 0 & 0 \\ 0 & 0 & 0 & 0 & 0 \\ 0 & 0 & 0 & -\frac{1}{L_c} & 0 \\ 0 & 0 & 0 & 0 & -\frac{1}{L_c} \end{bmatrix} \begin{bmatrix} v_{Ld} \\ v_{Lq} \\ v_{od} \\ v_{oq} \\ \omega \end{bmatrix} + \begin{bmatrix} \omega i_{Lq} \\ -\omega i_{Ld} \\ \omega v_{cq} \\ -\omega v_{cd} \\ \omega i_{oq} \\ -\omega i_{od} \end{bmatrix}$$

The short form of equation (30) is:

$$\dot{x}_{filter} = A_{filter} x_{filter} + B_{filter} u_{filter} + R_{filter}(x,u)$$

where:
$x_{filter} = [i_{Ld} \, i_{Lq} \, v_{cd} \, v_{cq} \, i_{od} \, i_{oq}]^T$ is the state vector,
$u_{filter} = [v_{ld} \, v_{lq} \, v_{od} \, v_{oq} \, \omega]^T$ is the input vector,
$R_{filter}(x,u) = [\omega i_{Lq} \, -\omega i_{Ld} \, \omega v_{cq} \, -\omega v_{cd} \, \omega i_{oq} \, -\omega i_{od}]^T$, and
$y_{filter} = [i_{Ld} \, i_{Lq} \, i_{od} \, i_{oq} \, \omega]^T$ is the output vector.

Aggregating the models of all microgrid components, the input vector ($u_{cci}$) is given by:

$$u_{cci} = [V_{DC} V_{oa} V_{ob} V_{oc} P^* Q^*]^T \quad (31)$$

The state variables are given by:

$$x_{cci} = [\theta \phi_{PLL} i_{Ld}^* i_{Lq} q_{3d} q_{3q} q_{Ld}^{err} q_{Lq}^{err} i_{Ld} i_{Lq} v_{vd} v_{cq} i_{od} i_{oq}]^T \quad (32)$$

The state matrix of the whole system $A_{CCI}$ can be given as:

$$A_{CCI} = \begin{bmatrix} [A_{PLL}] & 0 & 0 & 0 \\ 0 & [A_{p\_controller}] & 0 & 0 \\ 0 & 0 & [A_{c\_controller}] & 0 \\ 0 & 0 & 0 & [A_{filter}] \end{bmatrix} \quad (33)$$

where:

$$A_{CCI} = \quad (34)$$

$$\begin{bmatrix} 0 & k_I^{PLL} & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 \\ 0 & 0 & -\sqrt{2}\omega_c & 0 & \omega_c^2 & 0 & 0 & 0 & 0 & 0 & 0 & 0 & 0 \\ 0 & 0 & 0 & -\sqrt{2}\omega_c & 0 & \omega_c^2 & 0 & 0 & 0 & 0 & 0 & 0 & 0 \\ 0 & 0 & -1 & 0 & 0 & 0 & 0 & 0 & 0 & 0 & 0 & 0 & 0 \\ 0 & 0 & 0 & -1 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 \\ 0 & 0 & 0 & 0 & 0 & 0 & 0 & \frac{-R_f}{L_f} & 0 & \frac{-1}{L_f} & 0 & 0 \\ 0 & 0 & 0 & 0 & 0 & 0 & 0 & 0 & \frac{-R_f}{L_f} & 0 & \frac{-1}{L_f} & 0 & 0 \\ 0 & 0 & 0 & 0 & 0 & 0 & 0 & 0 & \frac{1}{C_f} & 0 & 0 & 0 & \frac{-1}{C_f} & 0 \\ 0 & 0 & 0 & 0 & 0 & 0 & 0 & 0 & 0 & \frac{1}{C_f} & 0 & 0 & 0 & \frac{-1}{C_f} \\ 0 & 0 & 0 & 0 & 0 & 0 & 0 & 0 & 0 & 0 & \frac{1}{L_c} & 0 & \frac{-R_c}{L_c} & 0 \\ 0 & 0 & 0 & 0 & 0 & 0 & 0 & 0 & 0 & 0 & 0 & \frac{1}{L_c} & 0 & \frac{-R_c}{L_c} \end{bmatrix}$$

Figure 7:
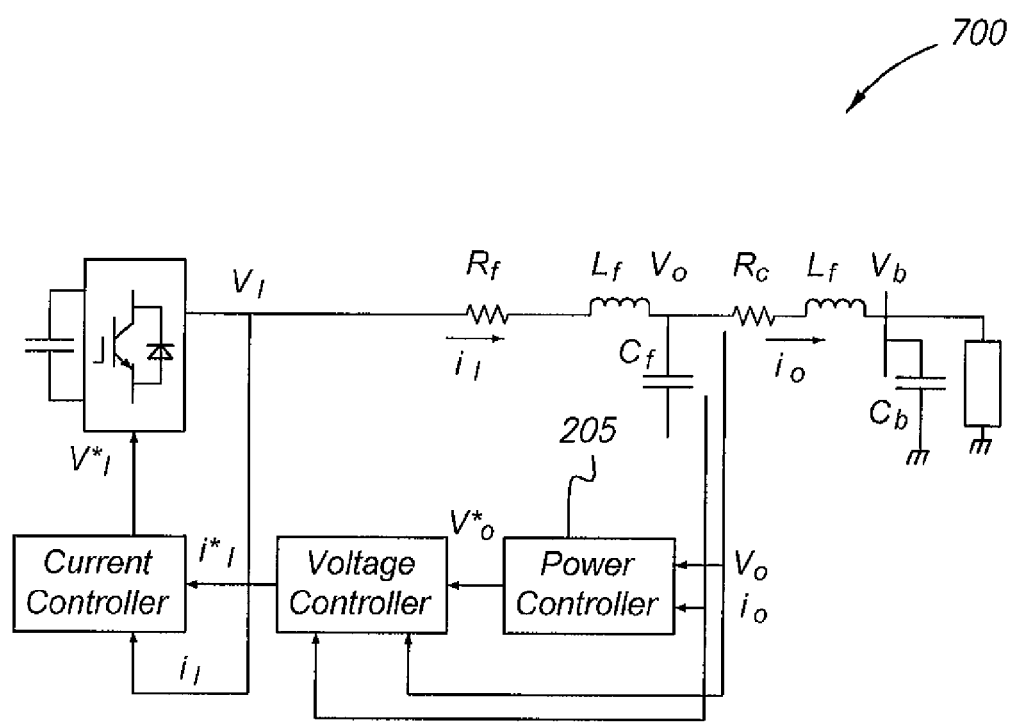
FIG. 7 is a block diagram of a microgrid operating in autonomous mode.

The particle swarm optimization system and method for microgrids utilizes the mathematical model of the autonomous microgrid comprising a VSI controller connected to the loads through an LC filter and coupling inductance 220. Referring to the circuit 700 of FIG. 7, power, current, and voltage controllers are used to control the microgrid inverter in the autonomous mode. The modeling of the VSI and its controllers comprise, first, calculating the active and reactive powers using the measured output current and voltage of the VSI. An external power control loop sets the magnitude and frequency (and hence phase) for the fundamental component of the inverter output voltage according to the droop characteristics set for the real and reactive powers. Then, the voltage and current controllers are designed to reject high frequency disturbances and provide sufficient damping for the LC filter.

Figure 8:
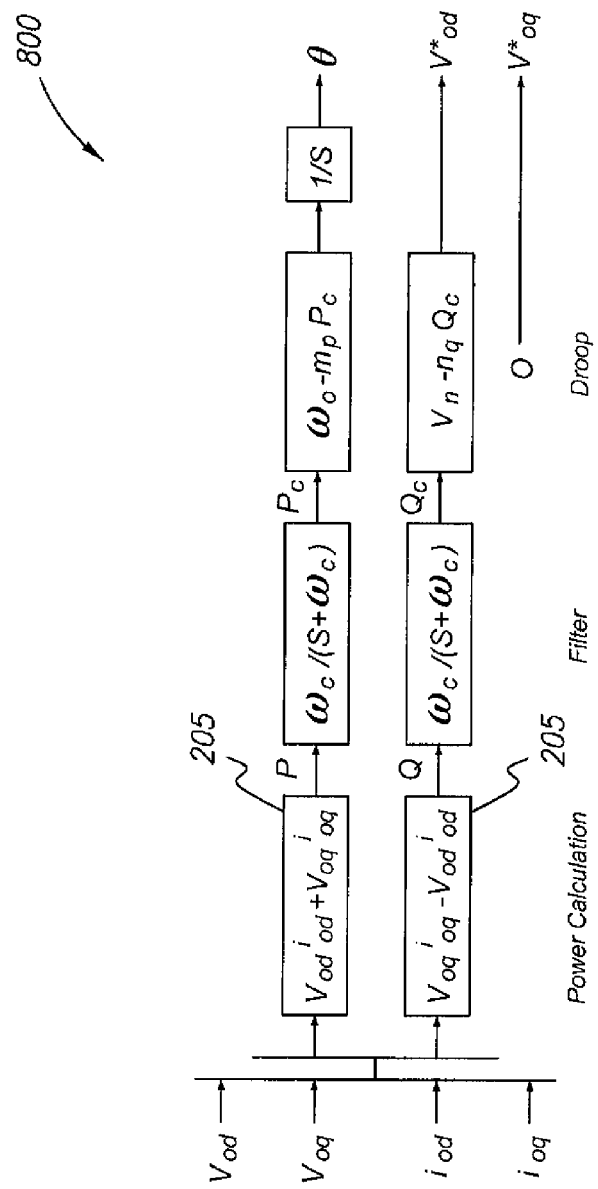
FIG. 8 is a plot showing calculation of characteristics in a power controller circuit in a particle swarm optimization system for microgrids according to the present invention.

Regarding the power controller 800, as shown by the equations in FIG. 8, in a conventional power system, synchronous generators share any increase in the load by decreasing the frequency according to their governor droop characteristic. In the autonomous mode, the inverter emulates the behavior of a synchronous machine. Therefore, the angle δ can be controlled by regulating the real power P, while the output voltage is controllable through the reactive power Q. Control of the frequency dynamically controls the power angle δ, and thus the real power flow. For stable operation, the real and reactive power output of the inverters should be properly controlled. The measured output voltage and current are used to calculate the instantaneous active and reactive power in the relation, $$P_m = v_{od}i_{od} + v_{oq}i_{oq}, Q_m = v_{od}i_{oq} - v_{oq}i_{od} \tag{35}$$

and the real and reactive powers $P_c$ and $Q_c$ corresponding to the fundamental components are obtained after passing these power components through the low pass filter, as follows:

$$P_c = \frac{\omega_c}{\omega_c + s} P_m, \quad Q_c = \frac{\omega_c}{\omega_c + s} Q_m \tag{36}$$

Figure 9A:
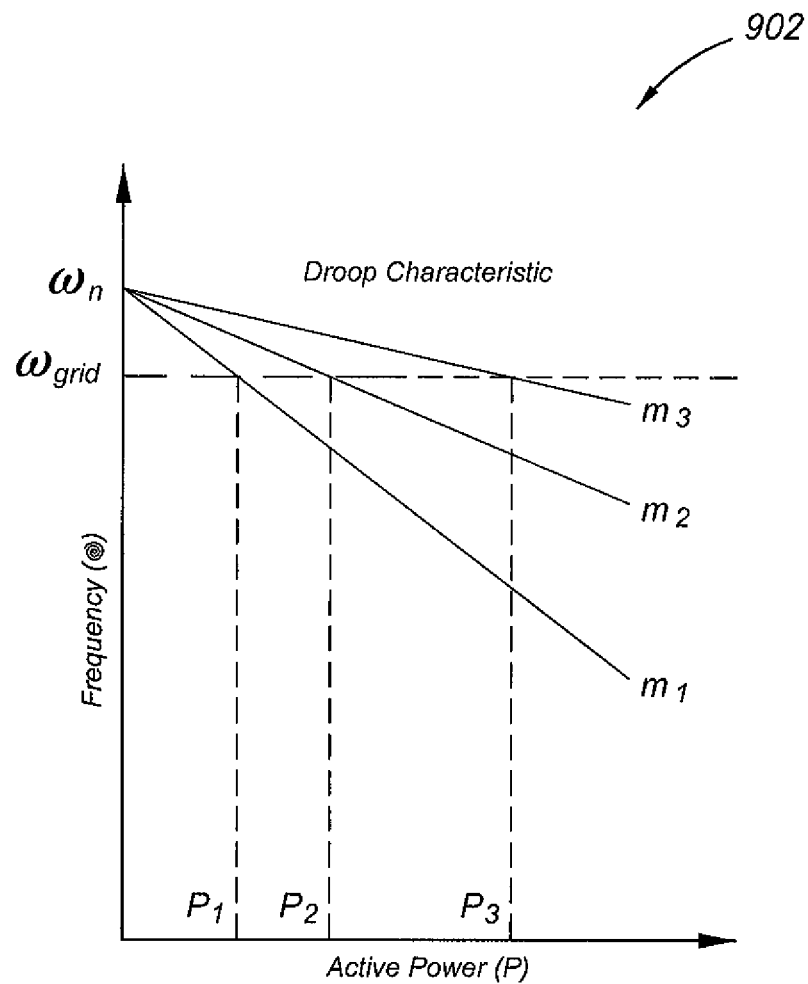
FIG. 9A is a plot of frequency vs. active power for three inverters with different real power sharing coefficients ($m_1$, $m_2$, $m_3$) in a particle swarm optimization system for microgrids according to the present invention, illustrating the different droop characteristics.
Figure 9B:
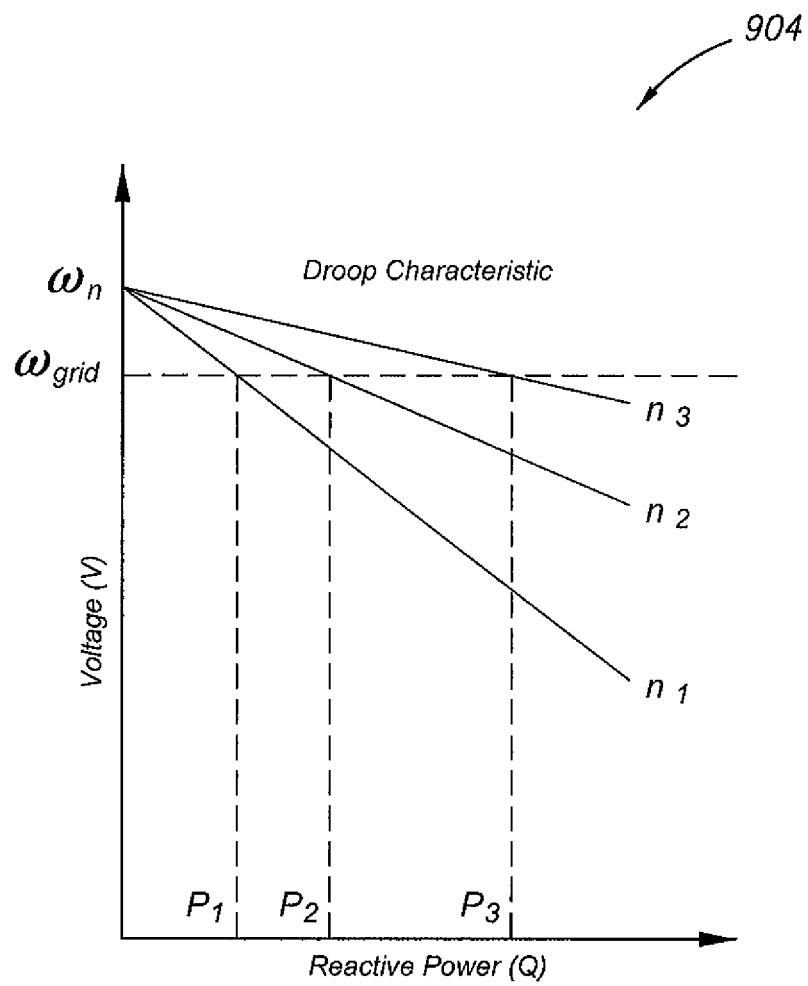
FIG. 9B is a plot of voltage vs. reactive power or three inverters with different reactive power sharing coefficients ($n_1$, $n_2$, $n_3$) in a particle swarm optimization system for microgrids according to the present invention, further illustrating the different droop characteristics.
Figure 10:
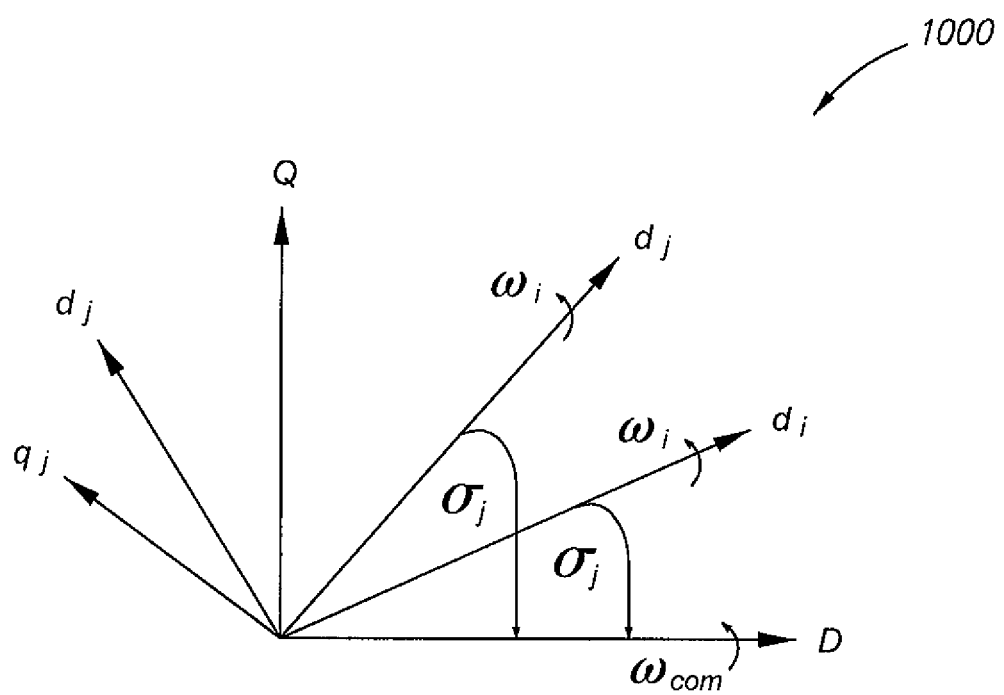
FIG. 10 is a chart showing an exemplary use of the power angle δ, representing the angle between an individual inverter reference frame and the common reference frame, used to translate the variables from the individual inverter reference frame onto the common reference frame.

Finally, the frequency ω and the output d-axis voltage magnitude reference $v_{od}^*$ can be determined as:

$$\omega = \omega_n - m_p P_c, \dot{\theta} = \omega \tag{37}$$

$$v_{od}^* = V_n - n_q Q_c, v_{oq}^* = 0 \tag{38}$$

where $m_p$ and $n_q$ are the real and reactive power sharing coefficients. The different droop characteristics show that, e.g., three inverters can share the total real and reactive power, as shown in the active power droop plot 902 of FIG. 9A and the reactive power droop plot 904 of FIG. 9B. The reference frame of one of the inverters is taken as the common frame. The angle δ shown in the plot 1000 of FIG. 10, represents the angle between an individual inverter reference frame and the common reference frame. This angle is used to translate the variables from an individual inverter reference frame onto the common frame according to the relation:

$$\delta = \int \omega - \omega_{com} \tag{39}$$

Figure 11:
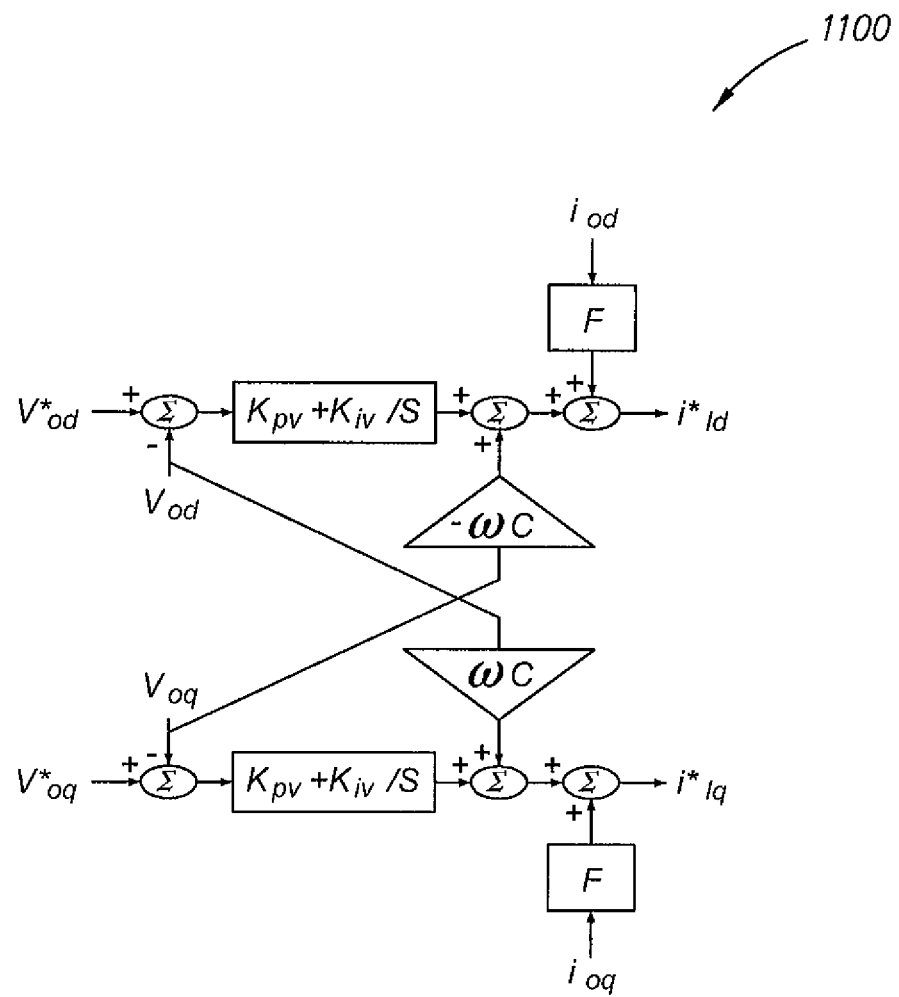
FIG. 11 is a block diagram of a voltage controller in a particle swarm optimization system for microgrids according to the present invention, the microgrid operating in autonomous mode.

The system diagram 1100 of the PI voltage controller is shown in FIG. 11. The corresponding state equations are given as:

$$\phi_d^* = v_{od}^* - v_{od}, \phi_q^* = v_{oq}^* - v_{oq} \tag{40}$$

along with the algebraic equations:

$$i_{ld}^* = Fi_{od} - \omega_n C_f v_{oq} + k_{pv}(v_{od}^* - v_{od}) + k_{iv}\phi_d$$

$$i_{lq}^* = Fi_{oq} + \omega_n C_f v_{od} + k_{pv}(v_{oq}^* - v_{oq}) + k_{iv}\phi_q \tag{41}$$

where F is the feed forward voltage controller gain and $k_{pv}$ and $k_{iv}$ are the PI voltage controller parameters.

Figure 12:
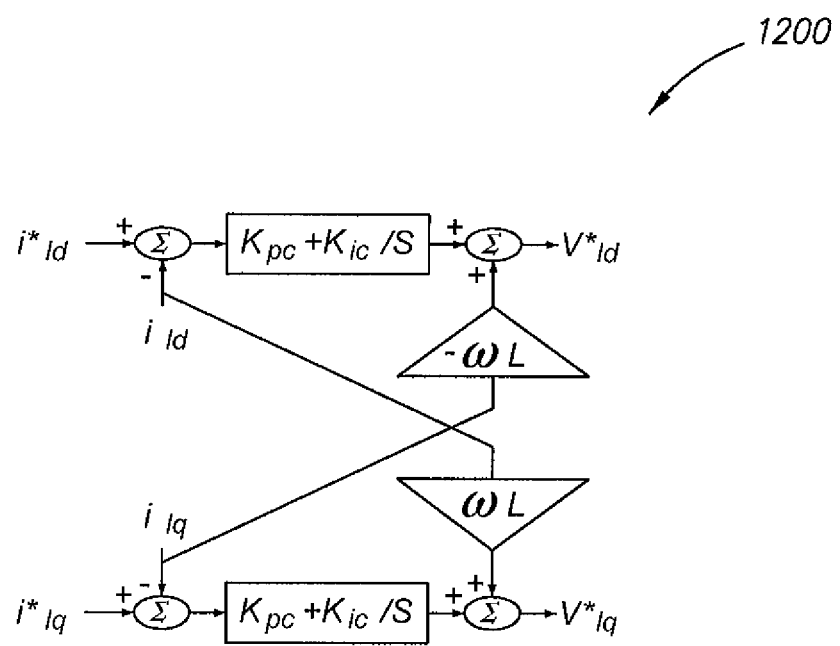
FIG. 12 is a block diagram of a current controller in a particle swarm optimization system for microgrids according to the present invention, the microgrid operating in autonomous mode.

The system diagram 1200 of the PI current controller is shown in FIG. 12. The corresponding state-space model is:

$$\gamma_d^* = i_{ld}^* - i_{ld}, \gamma_q^* = i_{lq}^* - i_{lq} \tag{42}$$

$$v_{ld}^* = -\omega_n L_f i_{lq} + k_{pc}(i_{ld}^* - i_{ld}) + k_{ic}\gamma_d$$

$$v_{lq}^* = \omega_n L_f i_{ld} + k_{pc}(i_{lq}^* - i_{lq}) + k_{ic}\gamma_q \tag{43}$$

where $k_{pc}$ and $k_{ic}$ are the PI current controller parameters.

The LC filter and the coupling inductance model can be described with the following state equations, assuming that inverter produces the demanded voltage $v_1 = v_1^*$.:

$$\dot{i}_{ld} = -\frac{R_f}{L_f} i_{ld} + \omega i_{lq} + \frac{1}{L_f}(v_{ld} - v_{od}) \tag{44}$$

$$\dot{i}_{lq} = -\frac{R_f}{L_f} i_{lq} + \omega i_{ld} + \frac{1}{L_f}(v_{lq} - v_{oq}) \tag{45}$$

$$\dot{v}_{od} = \omega v_{oq} + \frac{1}{C_f}(i_{ld} - i_{od}) \tag{46}$$

$$\dot{v}_{oq} = -\omega v_{od} + \frac{1}{C_f}(i_{lq} - i_{oq}) \tag{47}$$

$$\dot{i}_{od} = -\frac{R_c}{L_c} i_{od} + \omega i_{oq} + \frac{1}{L_c}(v_{od} - v_{bd}) \tag{48}$$

$$\dot{i}_{oq} = -\frac{R_c}{L_c} i_{oq} - \omega i_{od} + \frac{1}{L_c}(v_{oq} - v_{bq}) \tag{49}$$

To build the whole model of the system, the output variables of each inverter should be converted to the common reference frame using the following transformation:

$$f_{DQ} = T_i f_{dq} \tag{50}$$

$$T_i = \begin{bmatrix} \cos(\delta_i) & -\sin(\delta_i) \\ \sin(\delta_i) & \cos(\delta_i) \end{bmatrix} \tag{51}$$

The state equations of the RL load connected at $i^{th}$ node are given as follows:

$$\dot{i}_{loadDi} = -\frac{R_{loadi}}{L_{loadi}} i_{loadDi} + \omega i_{loadQi} + \frac{1}{L_{loadi}} v_{bDi} \tag{54}$$

$$\dot{i}_{loadQi} = -\frac{R_{loadi}}{L_{loadi}} i_{loadQi} + \omega i_{loadDi} + \frac{1}{L_{loadi}} v_{bQi} \tag{55}$$

The load voltages are also given as follows:

$$\dot{v}_{bDi} = \omega v_{bQi} + \frac{1}{C_f}(i_{oDi} - i_{loadDi} \pm i_{lineDi,j}) \tag{56}$$

$$\dot{v}_{bQi} = -\omega v_{bDi} + \frac{1}{C_f}(i_{oQi} - i_{loadQi} \pm i_{lineQi,j}) \tag{57}$$

The sign in equations (56) and (57) depends on the current direction in the line.

For microgrid stability enhancement, settings of the controller parameters, the filter components, and the power sharing coefficients must be optimized. The design problem is formulated as follows.

In grid-connected mode, the optimized parameters are: $k_p^d$, $k_i^d$, $k_p^q$, $k_i^q$, $L_f$, $C_f$, and $R_d$. Eigenvalue-based and nonlinear time domain simulation-based objective functions are proposed as follows:

$$J_{linear\_model} = \max\{Real(\lambda_i)\} \tag{58}$$

$$J_{nonlinear\_model} = \min\{P_{measured} - P_{reference}\}^2 \tag{59}$$

In autonomous mode, the optimized parameters are $k_{pv}$, $k_{iv}$, $k_{pc}$, $k_{ic}$, $m_p$, and $n_q$. The nonlinear time domain simulation-based objective function given in equation (59) is used.

Here, Real $(\lambda_i)$ is the real part of the $i^{th}$ mode eigenvalue. In the optimization process, the goal is to minimize $J_{linear\_model}$ in order to shift the poorly damped eigenvalues to the left in s-plane. Another goal is to minimize $J_{nonlinear\_model}$ in order to inject the required active and reactive powers from the microgrid into the utility grid.

In grid-connected mode, the problem constraints are the optimized parameter bounds, as follows:

$$k_p^{d\,min} \leq k_p^d \leq k_p^{d\,max} \tag{60}$$

$$k_i^{d\,min} \leq k_i^d \leq k_i^{d\,max} \tag{61}$$

$$k_p^{q\,min} \leq k_p^q \leq k_p^{q\,max} \tag{62}$$

$$k_i^{q\,min} \leq k_i^q \leq k_i^{q\,max} \tag{63}$$

$$L_f^{min} \leq L_f \leq L_f^{max} \tag{64}$$

$$C_f^{min} \leq C_f \leq C_f^{max} \tag{65}$$

$$R_d^{min} \leq R_d \leq R_d^{max} \tag{66}$$

In autonomous mode, the problem constraints are as follows:

$$k_{pv}^{min} \leq k_{pv} \leq k_{pv}^{max} \tag{67}$$

$$k_{iv}^{min} \leq k_{iv} \leq k_{iv}^{max} \tag{68}$$

$$k_{pc}^{min} \leq k_{pc} \leq k_{pc}^{max} \tag{69}$$

$$k_{ic}^{min} \leq k_{ic} \leq k_{ic}^{max} \tag{70}$$

$$m_p^{min} \leq m_p \leq m_p^{max} \tag{71}$$

$$n_q^{min} \leq n_q \leq n_q^{max} \tag{72}$$

The overall optimization problem can be formulated as:

$$\text{Minimize}(J_{linear\_model}) \text{ or Minimize}(J_{nonlinear\_model}) \tag{73}$$

subject to the constraints associated with the operation mode as given in equations (60)-(72).

Given the formulation of the overall optimization problem, a particle swarm optimization (PSO) method is utilized to solve equation (73).

Particle swarm optimization (PSO) is a population-based stochastic optimization technique developed by Eberhart and Kennedy in 1995, and was inspired by the social behavior of bird flocking or fish schooling. The particle motion is affected by the inertia, the personal best and the group best. The inertia is the particles' tendency to move in the direction of the original movement. The personal best is the best estimate of the objective function for that particle. The group best position is the best solution represented by the swarm in any given time step. An interaction of these components generates a direction of movement corresponding to each particle for the next time step.

The advantages of PSO over other traditional optimization techniques include the fact that PSO is a population-based search algorithm, so it is less susceptible to getting trapped on local minima. It uses payoff (objective function) information to guide the search in the problem space. It is more flexible and robust than conventional methods because it uses probabilistic transition rules. It can overcome the premature convergence problem and enhances the search capability. The solution quality of the proposed approach does not rely on the initial population. The algorithm ensures the convergence to the optimal solution starting anywhere in the search space.

In a PSO algorithm, the population has particles that represent candidate solutions. Each particle is an n-dimensional, real-valued vector, where n is the number of optimized parameters. Therefore, each optimized parameter represents a dimension of the problem space. The PSO technique can be described in the following steps.

In the first step, the time counter is set, n particles are randomly generated, and initial velocities for these particles are also randomly generated. For each particle, the objective function is evaluated. A search is made for the best value of this objective function, and this value is set as a global best function $J_{best}$ and global best particle $X_{best}$. The initial value of the inertia weight is set. The inertial weight is a control parameter used to control the impact of the previous velocity on the current velocity, w, as shown below in equation (74).

In the second step, the time counter is updated. In the third step, the inertia weight is updated using $w(t)=aw(t-1)$, where a is the a decrement constant smaller than but close to 1. In the fourth step, the velocity is updated using the following equation:

$$v_{n+1}^i = wv_n^i + c_1 r_1 (p_{best} - x_n^i) + c_2 r_2 (g_{best} - x_n^i) \tag{74}$$

where $c_1$ and $c_2$ are positive constants and $r_1$ and $r_2$ are uniformly distributed random numbers in [0,1]. The second term represents the cognitive part of PSO, where the particle changes its velocity based on its own thinking and memory. The third term represents the social part of PSO where the particle changes its velocity based on the social-psychological adaptation of knowledge.

In the fifth step, based on the updated velocities, each particle changes its position according to the following equation:

$$x_{n+1}^i = x_n^i + v_{n+1}^i \tag{75}$$

In the sixth step, each particle is evaluated according to the updated position. If the cost function of this particle at this moment is less than the global best $J_j^*$, then update individual best as a global best and go to step 7; else go to step 7 without performing the update. In the seventh step, search for the minimum value among the global best $J_j^*$, where min is the index of the particle with minimum objective function value, i.e., if $J_{min} > J^{}$, then update global best as $X^{} = X_{min}$ and $J^{**} = J_{min}$ and go to step 8; else go to step 8 without performing the global best updating.

In step 8, the search process will be terminated if one of the following conditions is met: either the number of iterations since the last change of the best solution is greater than a pre-specified number; or, the number of iterations reaches the maximum allowable. If one of the stopping criteria is satisfied, then stop, or else go to step 2.

Figure 13:
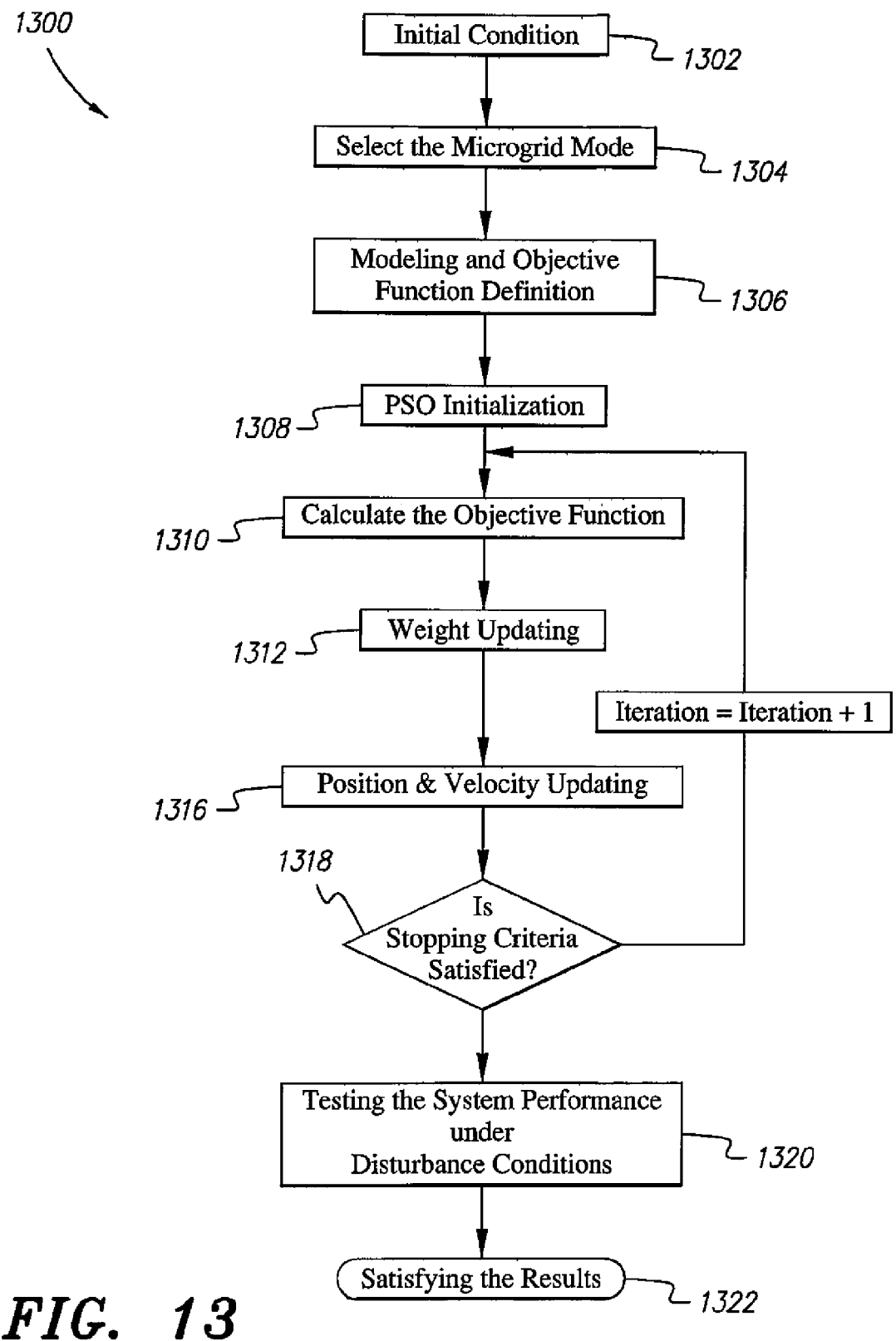
FIG. 13 is a computational flowchart of a particle swarm optimization method for microgrids according to the present invention.
Figure 14:
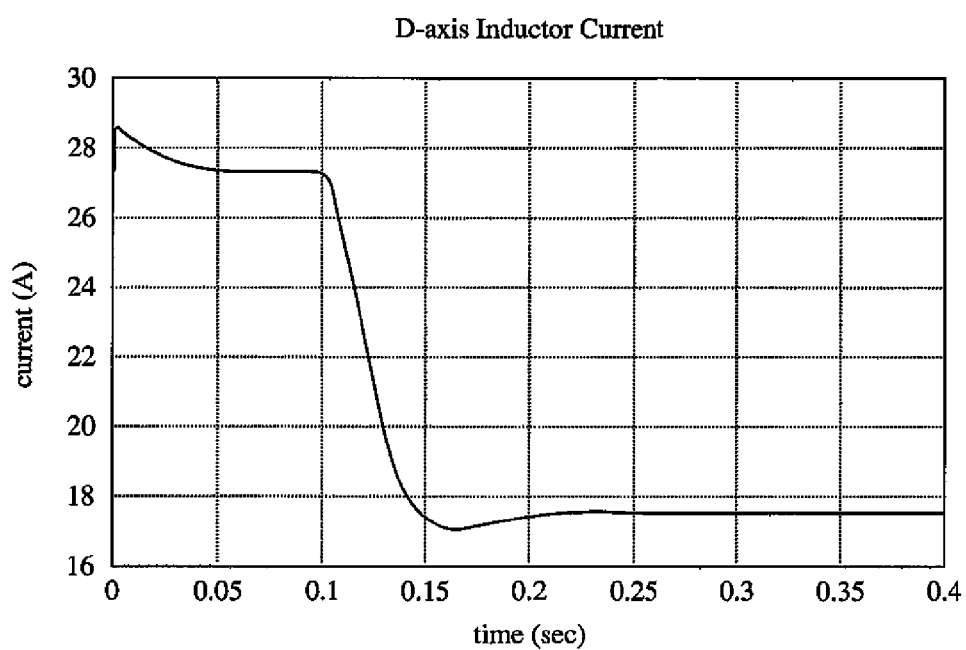
FIG. 14 is a D-axis inductor current plot for an exemplary DG in grid-connected mode optimized according to the particle swarm optimization method for microgrids according to the present invention.
Figure 15:
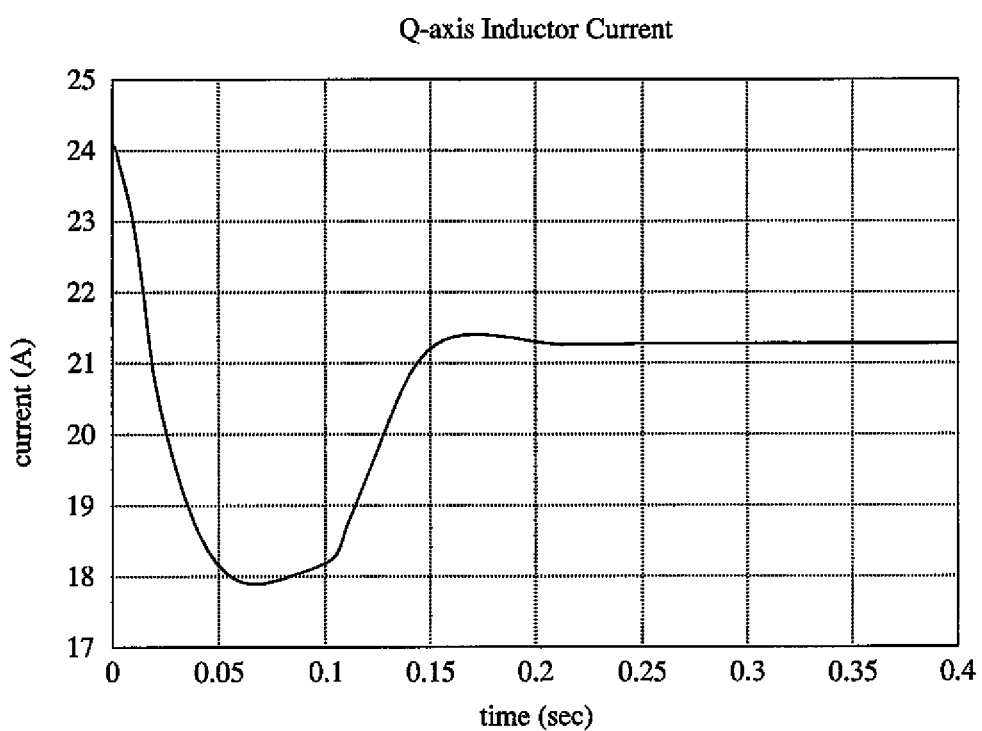
FIG. 15 is a Q-axis inductor current plot for an exemplary DG in grid-connected mode optimized according to the particle swarm optimization method for microgrids according to the present invention.
Figure 16:
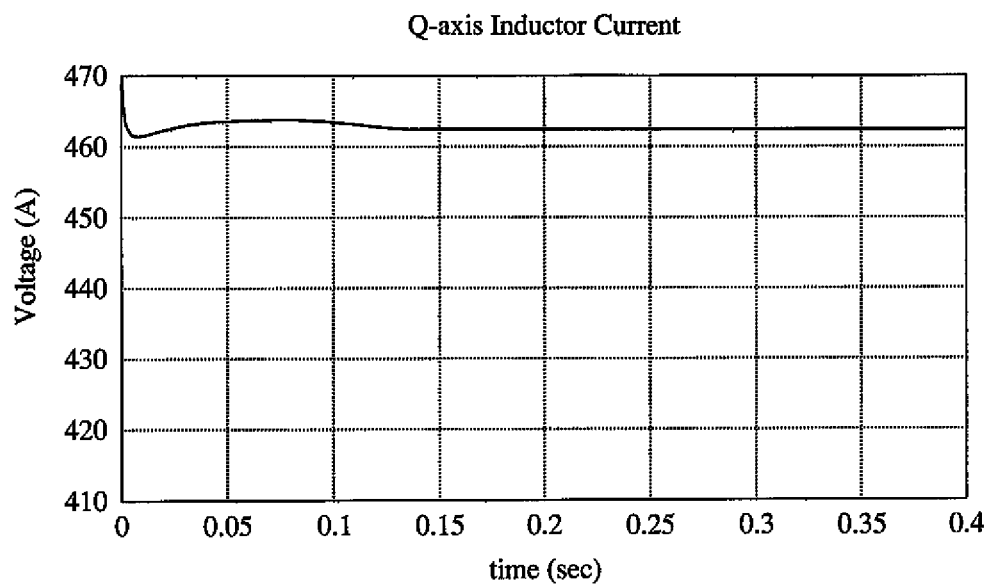
FIG. 16 is a measured d-axis voltage plot for an exemplary DG in grid-connected mode optimized according to the particle swarm optimization method for microgrids according to the present invention.
Figure 17:
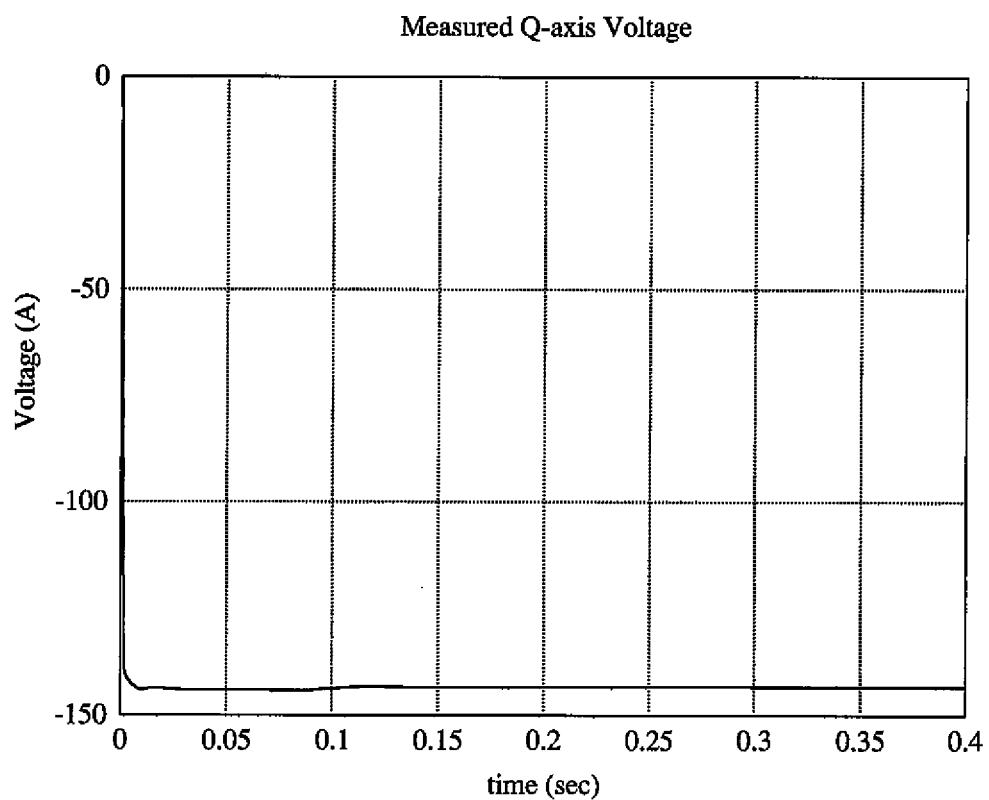
FIG. 17 is a measured q-axis voltage plot for an exemplary DG in grid-connected mode optimized according to the particle swarm optimization method for microgrids according to the present invention.
Figure 18:
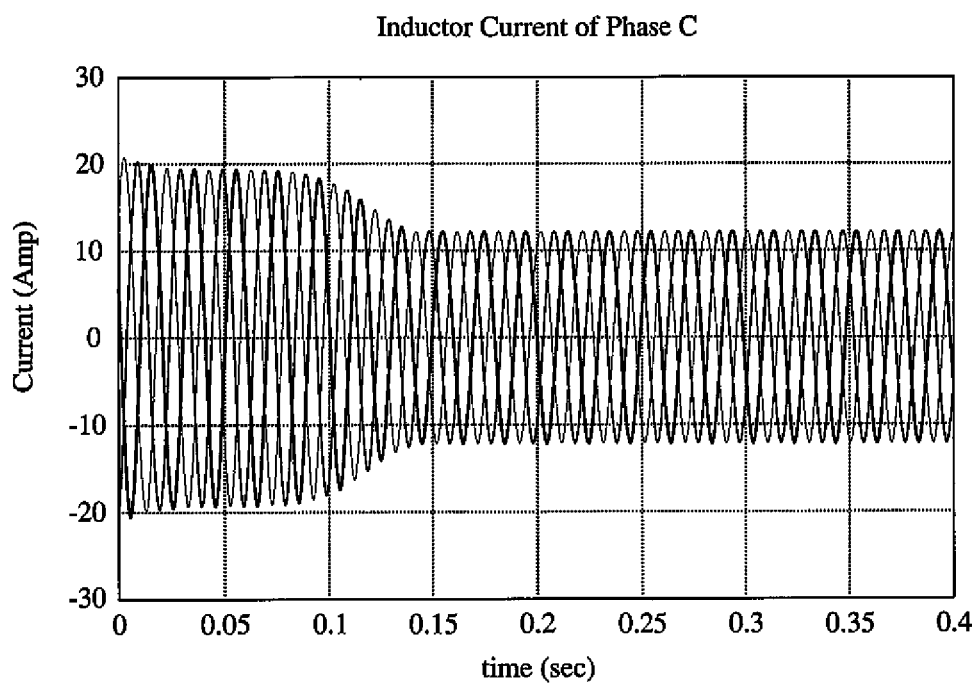
FIG. 18 is a three-phase inductor current plot for an exemplary DG in grid-connected mode optimized according to the particle swarm optimization method for microgrids according to the present invention.
Figure 19:
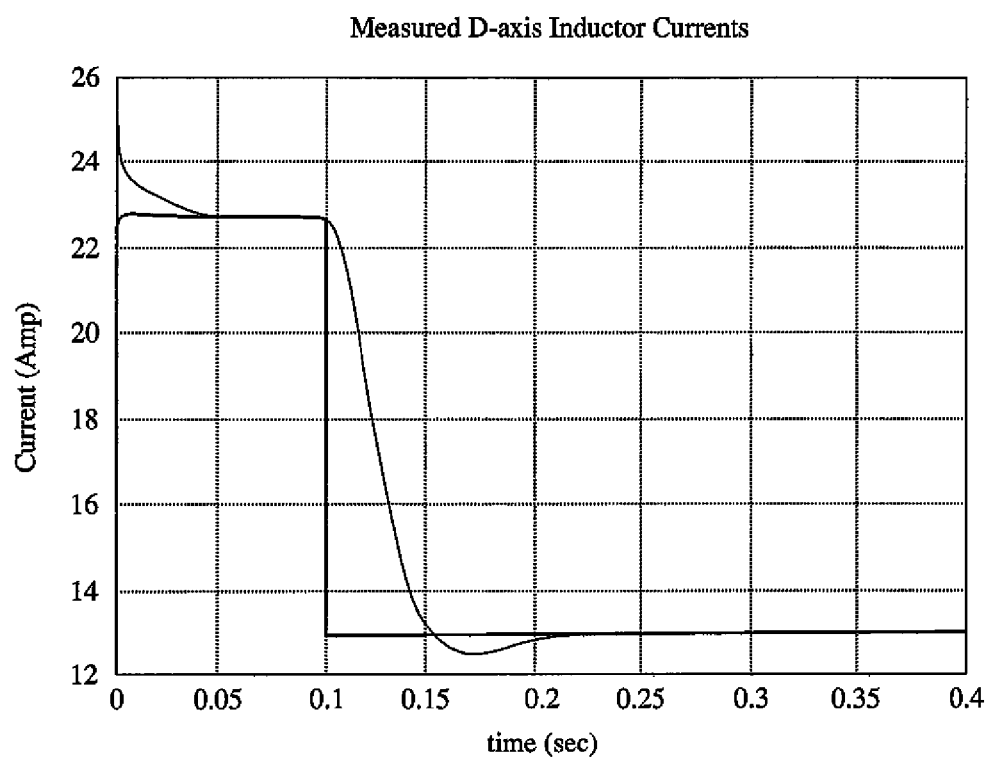
FIG. 19 is a measured and reference d-axis current plot for an exemplary DG in grid-connected mode optimized according to the particle swarm optimization method for microgrids according to the present invention.
Figure 20:
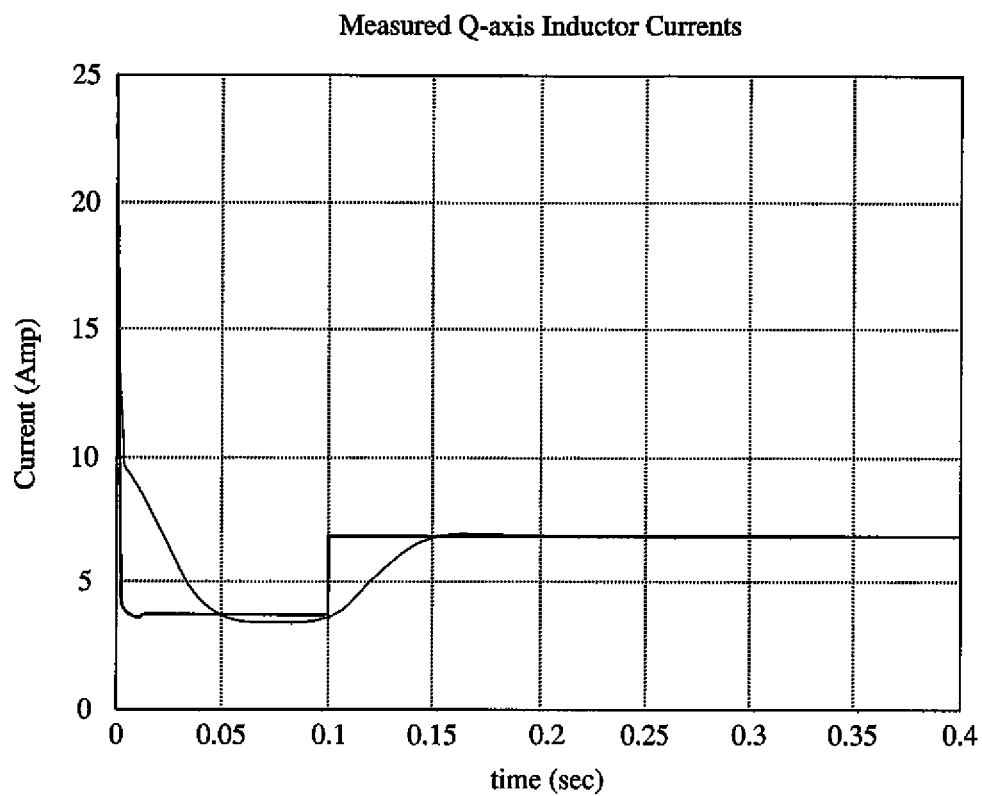
FIG. 20 is a measured and reference q-axis current plot for an exemplary DG in grid-connected mode optimized according to the particle swarm optimization method for microgrids according to the present invention.

Referring to FIG. 13, the PSO—based approach was implemented using the MATLAB code according to the steps in the flowchart 1300. Practically, experience shows that the most effective parameters on PSO performance are the initial inertia weight and the maximum allowable velocity. These parameters should be selected carefully for efficient performance of PSO. The exemplary parameter settings include: the Population size=20; the Acceleration Constants: $c_1$, $c_2$=2; Generation or iteration=100; Inertia weight factor=1; and Decrement constant ($\alpha$)=0.98

The computational flowchart 1300 of the PSO-based optimal design procedure 1300 is as follows. The initial conditions are set at step 1302. The microgrid mode is selected at step 1304. The modeling and objective function is defined at step 1306. The PSO algorithm is initialized at step 1308. The objective function is calculated at step 1310. Parameter weights are updated at step 1312. Position and velocity are updated at step 1316. Stopping criteria are checked at step 1318. Once the algorithm has terminated, the microgrid system is tested using the optimized parameters at step 1320. The test results are evaluated at step 1322.

Nonlinear and linear models were developed using MATLAB code to study the stability of an inverter-based microgrid when it is working in both grid-connected and autonomous modes.

The complete layout of an inverter-based Distributed Generation (DG) unit connected in the grid-connected mode is presented. The DG unit in the example is represented by a dc voltage source, a VSI, a series LC filter, and coupling inductance $L_c$. The rating of the test inverter-based DG is IOKVA. The inverter is controlled to inject the real and reactive powers required by the utility.

Figure 21:
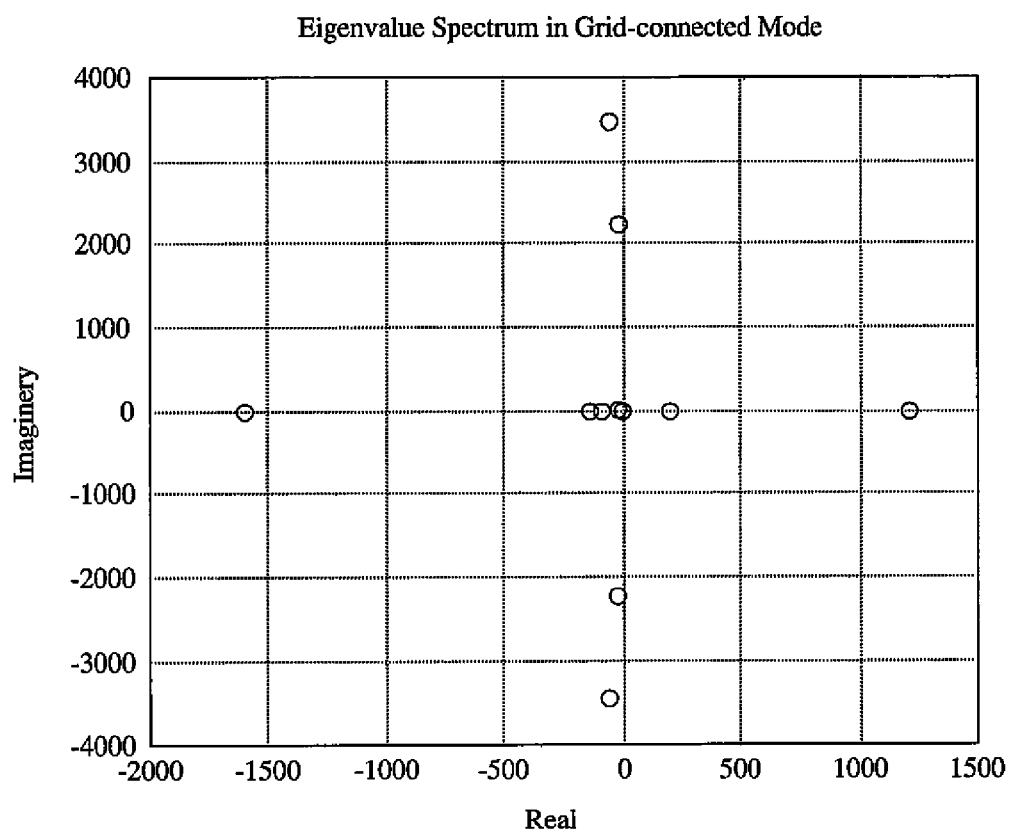
FIG. 21 is an eigenvalue spectrum plot for the exemplary DG without optimization.
Figure 22:
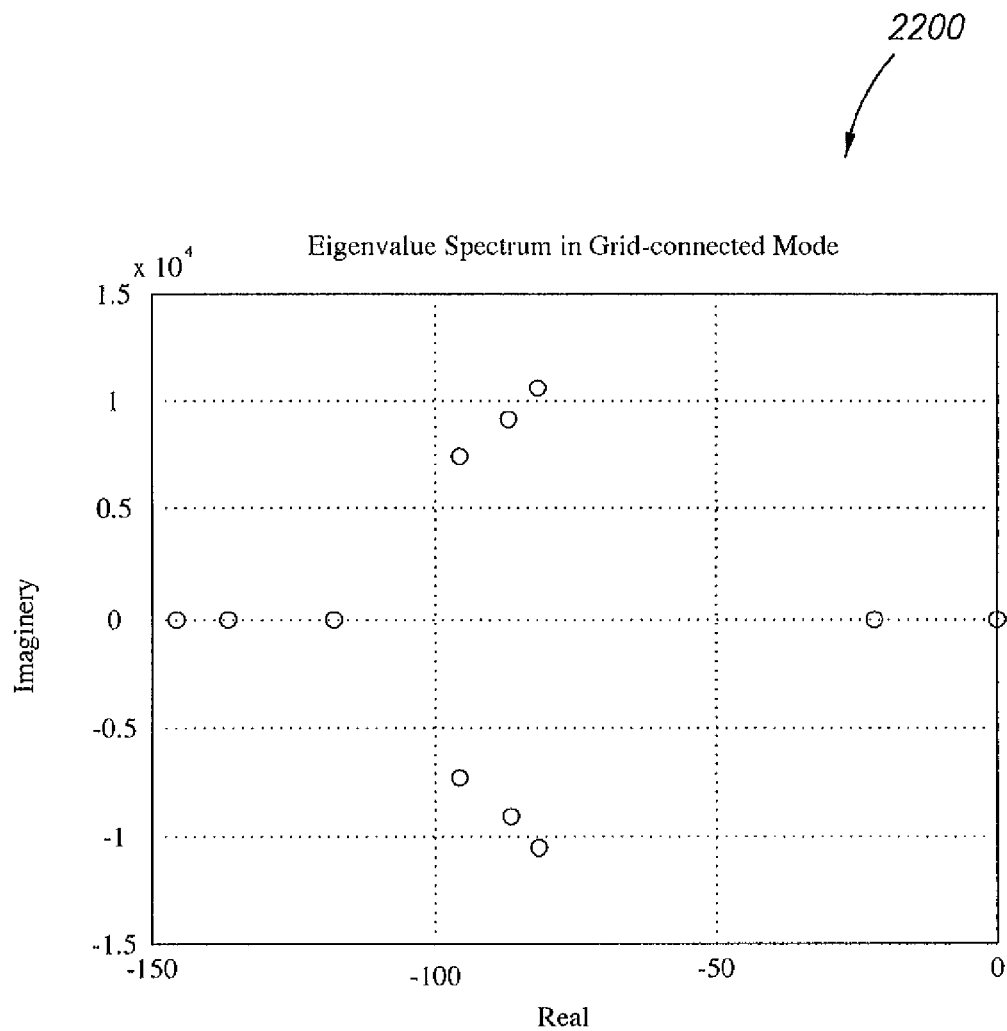
FIG. 22 is a eigenvalue spectrum plot for the exemplary DG with optimization.

To evaluate the effectiveness of the proposed controller, nonlinear time domain simulation has been carried out. A step change in the injected active power has been done to check the response of the power exported to the grid using the optimal parameters obtained using PSO. It is introduced at t=0.1 sec from 10 KW to 5 KW. The system response and performance under this disturbance are shown in FIGS. 14-20. It is clear that the system performance with the exemplary controllers is stable. It can be observed that the optimal parameters make the exemplary controllers capable of following the reference. It can be also seen that the response to the change in reference values is fast and without significant overshoot. Also, with these optimal parameters, the controller is effective Eigenvalue analysis has been carried out to demonstrate the effectiveness of the exemplary controllers and design approach. Without optimization, the eigenvalues of the system are shown in FIG. 21. It is clear that the system has positive eigenvalues, which means that the system is unstable. The exemplary PSO-based design approach has been implemented to shift the eigenvalues to the left in the s-plane. FIG. 22 shows that all unstable eigenvalues have been shifted to the left in the s-plane. This indicates that the system becomes stable with the optimized settings obtained. The optimal values obtained are $L_f$=0.324 mH, $C_f$=36.979 $\mu$F; $k_p^d$=$k_p^q$=0.8148; and $k_i^d$=$k_i^q$=36.156.

Figure 23:
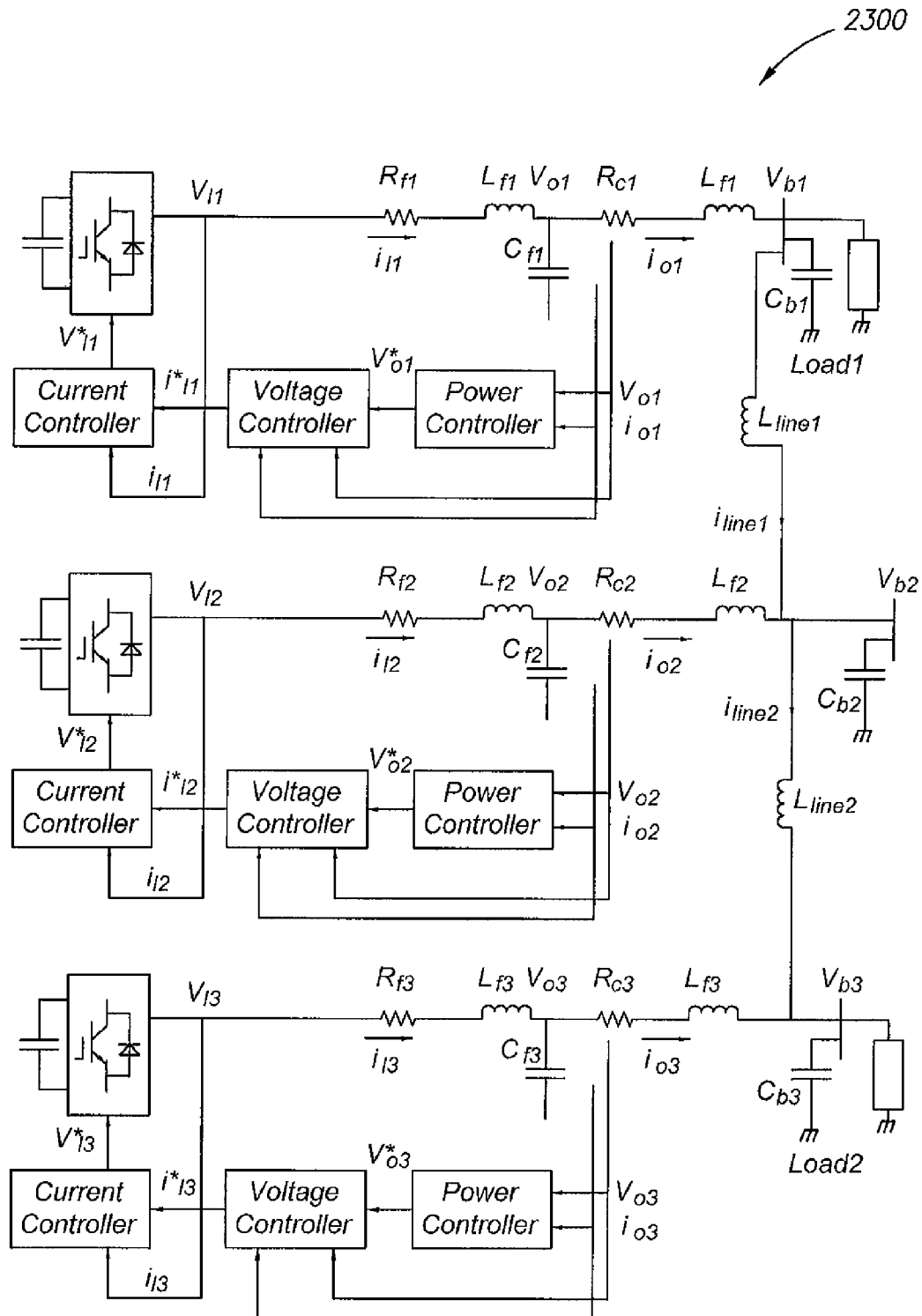
FIG. 23 is a circuit diagram of an exemplary three-inverter-based microgrid according to the present invention.

As shown in FIG. 23, in the autonomous mode, three inverter-based DGs (10 KVA) are connected in circuit 2300 with two loads through series LC filters, coupling inductance $L_c$, and lines, as shown in FIG. 23. Each DG unit is represented by a dc voltage source and VSI. A resistive load of 5.8 kW (25 per phase) at Load 1 and 7.3 kW (20 per phase) at Load 2 is considered as an initial operating point. The inverters are controlled to share the real and reactive powers over the lines. First, initial steady-state conditions of the system are obtained using a general power flow program. Second, nonlinear time domain simulations have been carried out at two different disturbances to examine the effectiveness of the optimal settings of the proposed controllers and power sharing coefficients. The first one is a step change in real power and the second is a fault disturbance at load 1. The results are given as follows.

Figure 24:
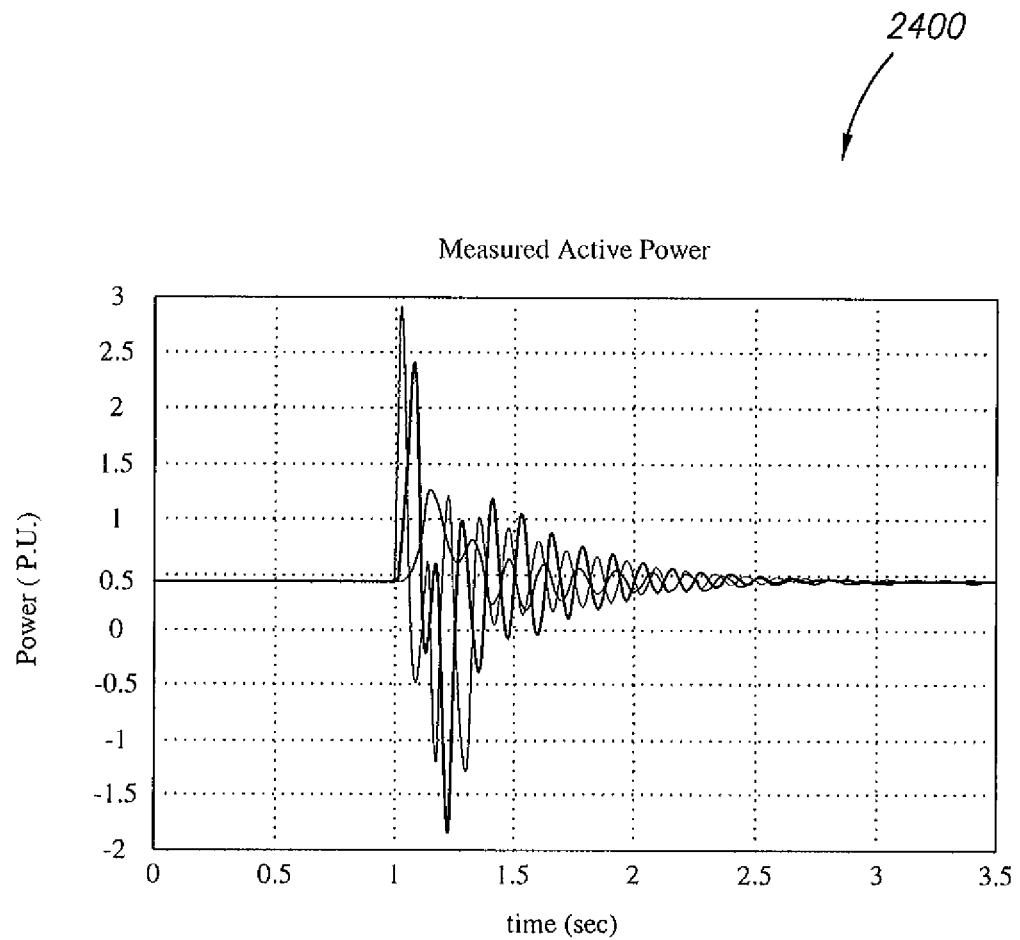
FIG. 24 is an output active power response plot for the microgrid of FIG. 23 operated in autonomous mode during a microgrid fault at load 1.
Figure 25:
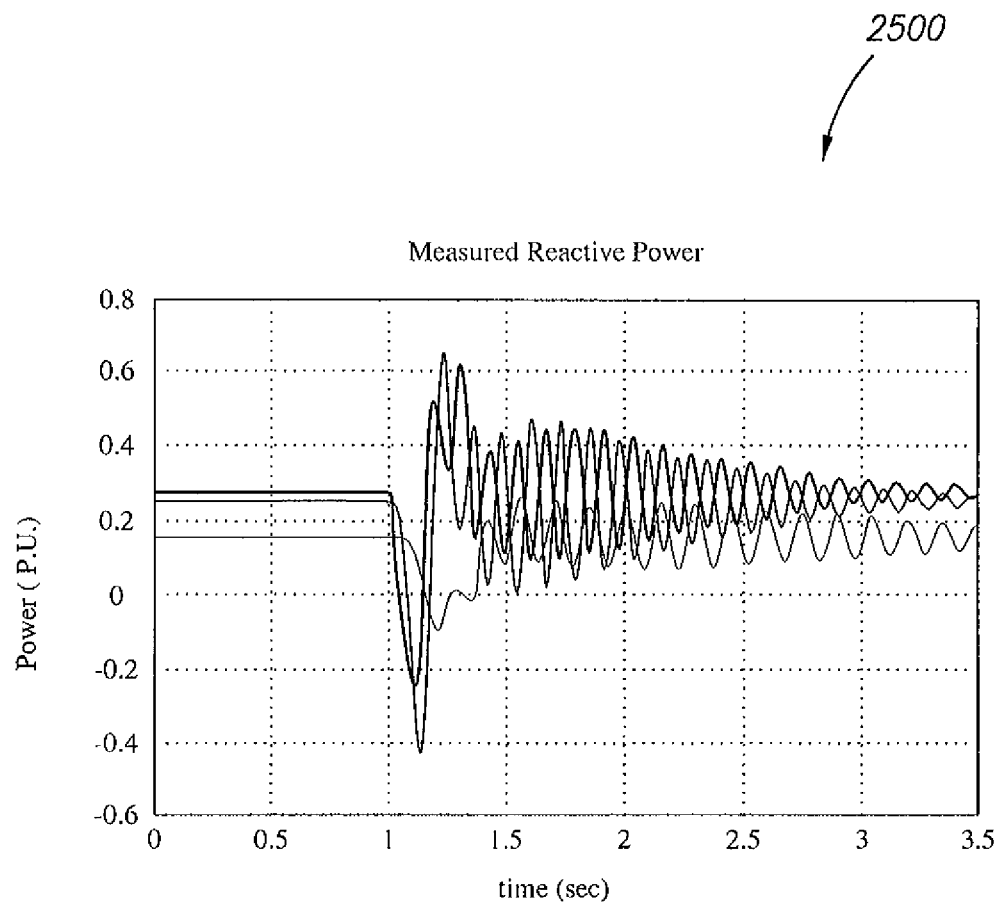
FIG. 25 is an output reactive power response plot for the microgrid of FIG. 23 operated in autonomous mode during a microgrid fault at load 1.
Figure 26:
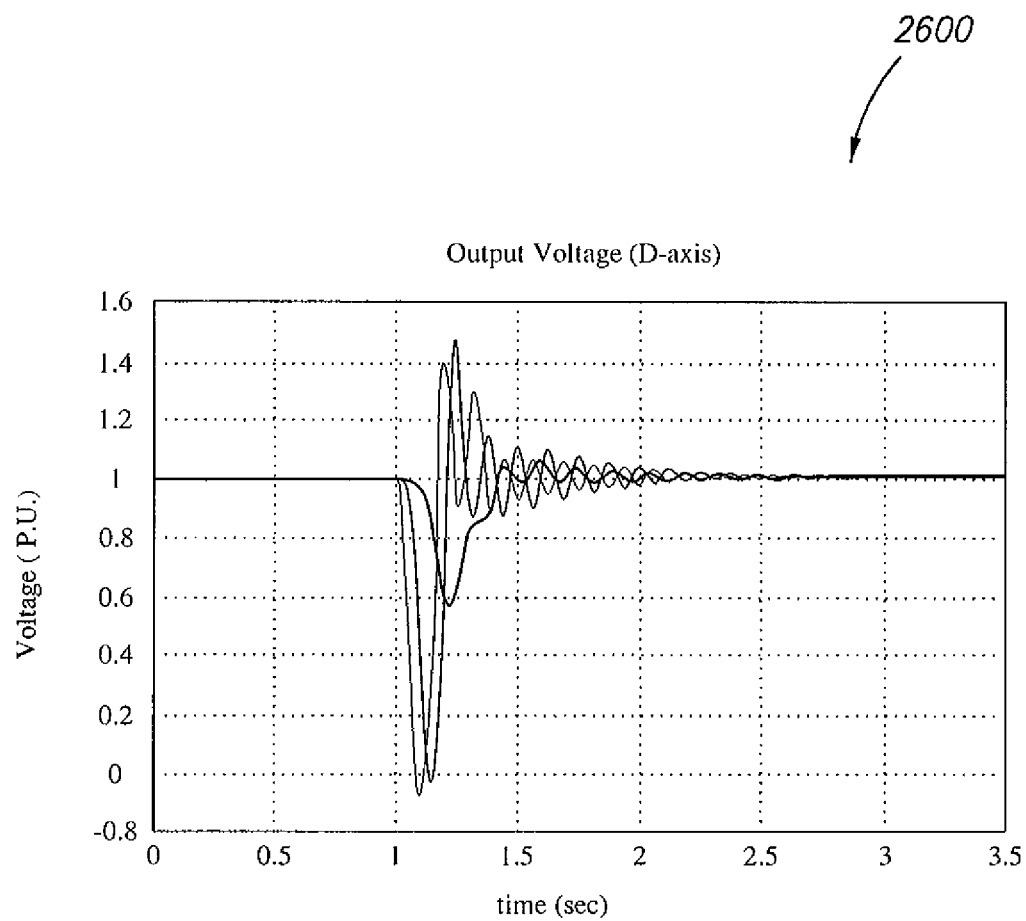
FIG. 26 is an output voltage d-axis response plot for the microgrid of FIG. 23 operated in autonomous mode during a microgrid fault at load 1.
Figure 27:
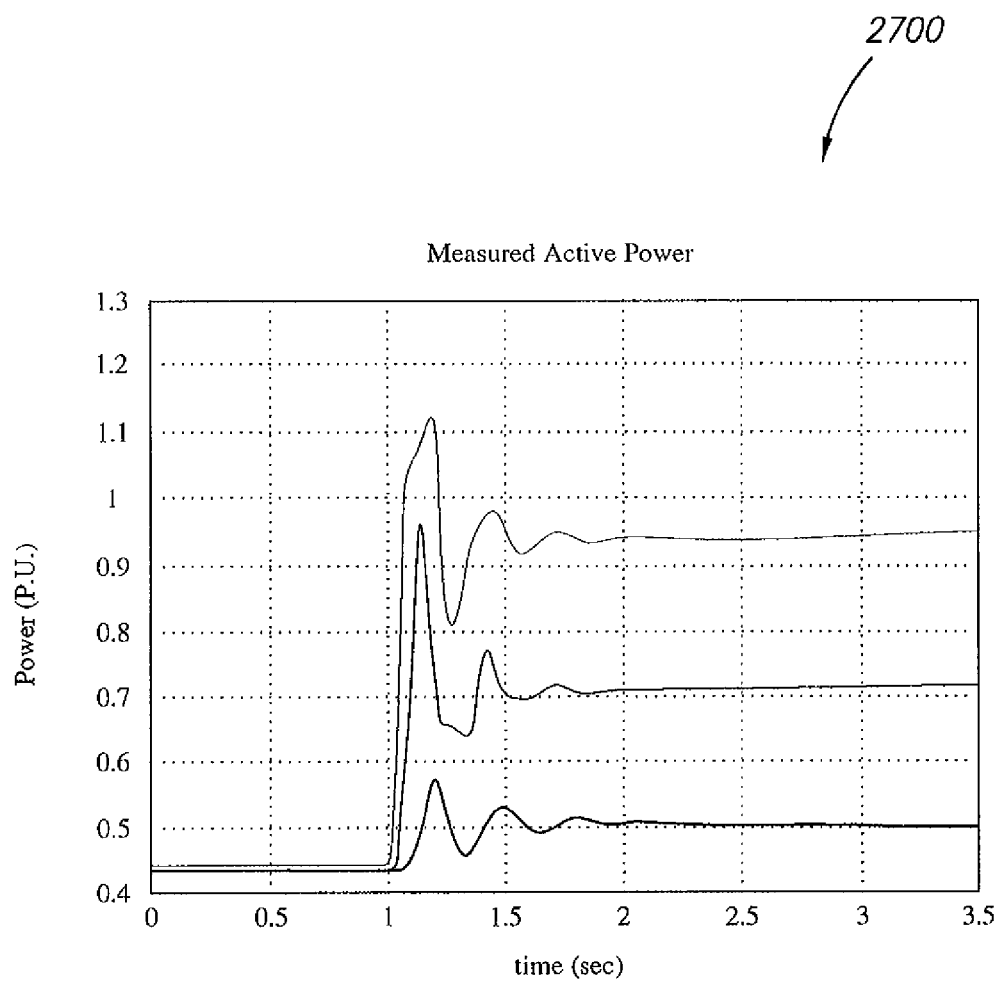
FIG. 27 is an output active power response plot for the microgrid of FIG. 23 operated in autonomous mode when a step response occurs at load 1.
Figure 28:
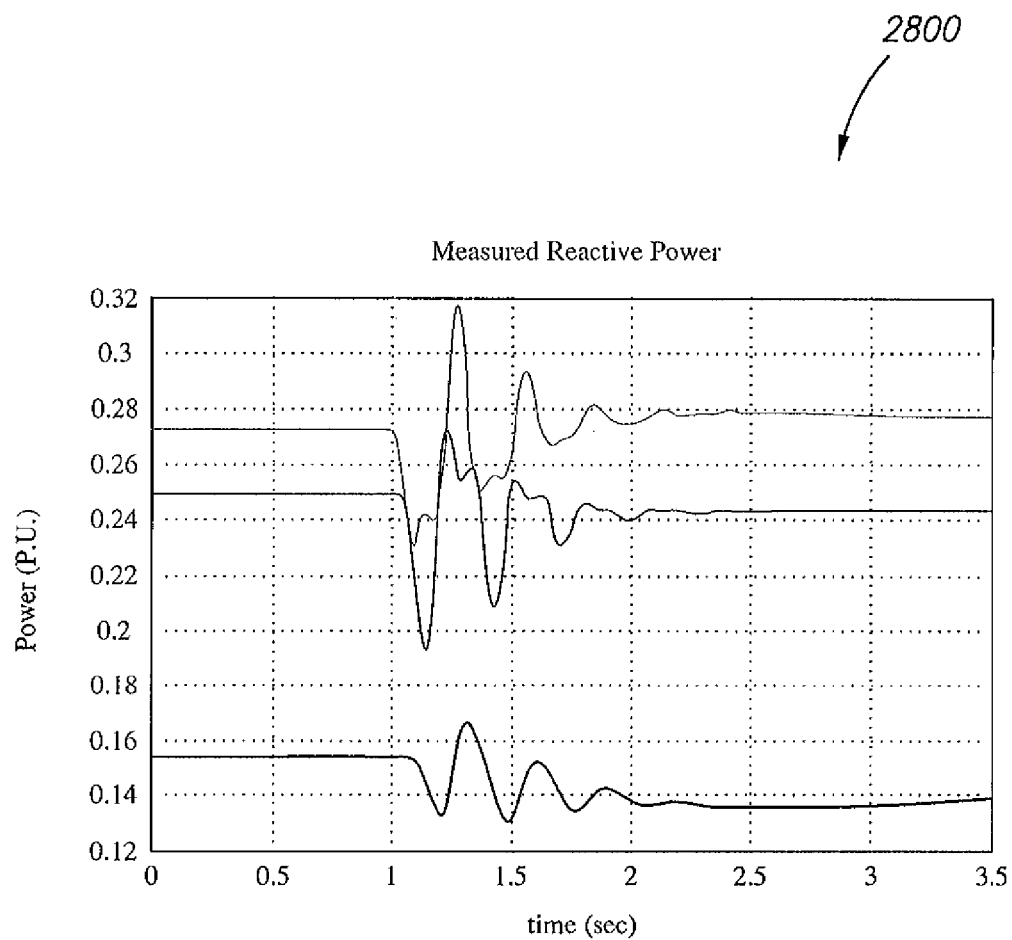
FIG. 28 is an output reactive power response plot for the microgrid of FIG. 23 operated in autonomous mode when a step response occurs at load 1.
Figure 29:
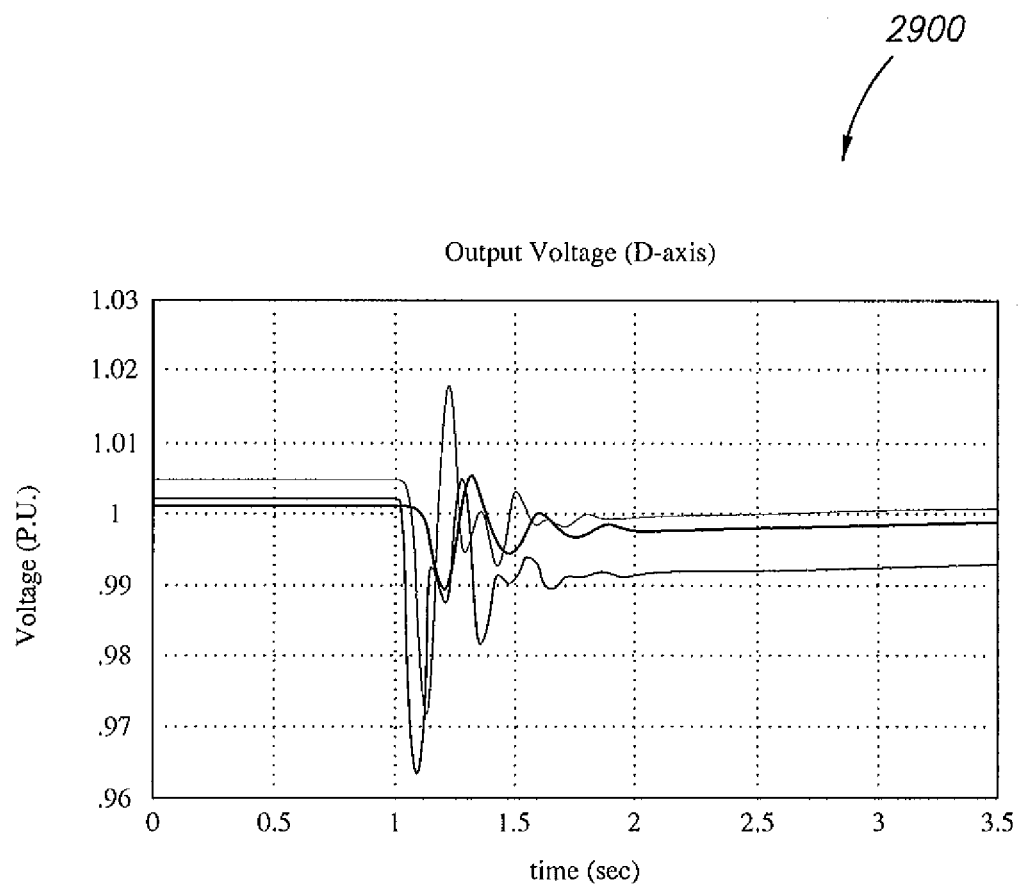
FIG. 29 is an output voltage d-axis response plot for the microgrid of FIG. 23 operated in autonomous mode when a step response occurs at load 1.
Figure 30:
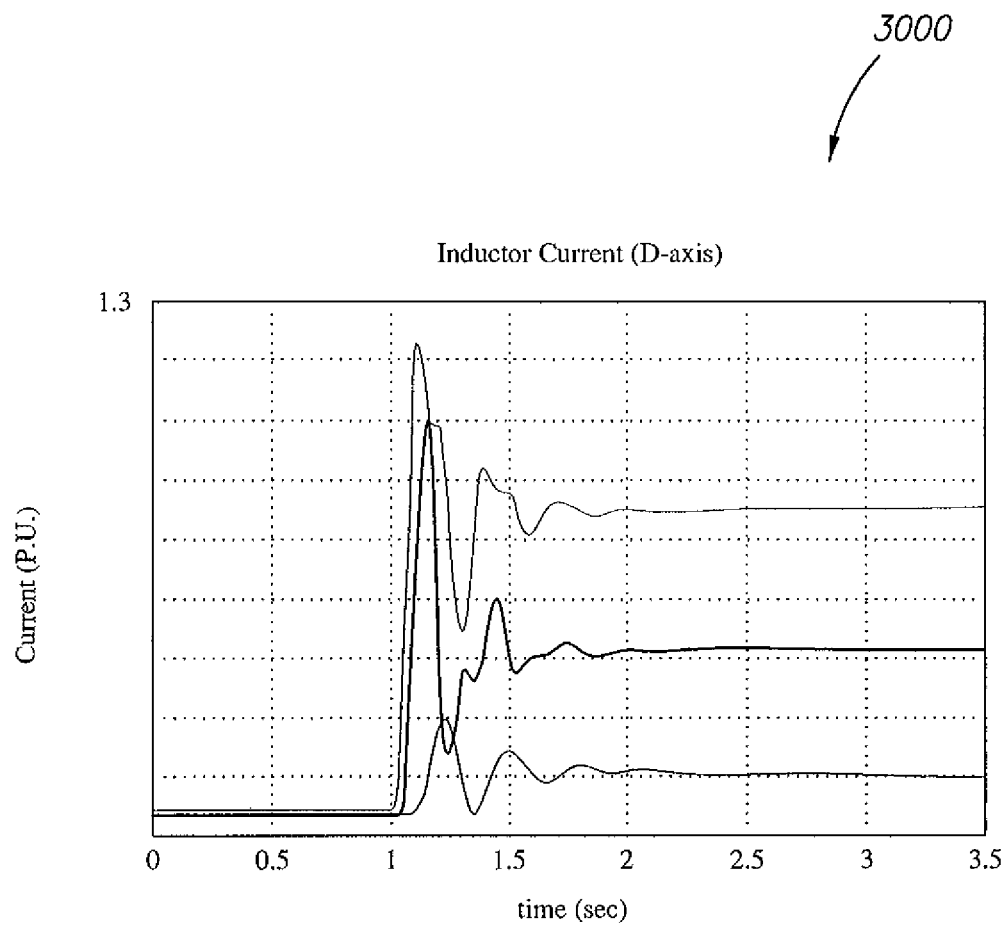
FIG. 30 is an inductor current d-axis response plot for the microgrid of FIG. 23 operated in autonomous mode when a step response occurs at load 1.

Plots 2400, 2500 and 2600 in FIGS. 24-26 show the system response under fault disturbance at load 1. It can be seen that the system has satisfactory damping characteristics. A step change of 3.8-kW real power has been also applied. Plots 2700 and 2800 of FIGS. 27-28 show the system response under this disturbance. Plot 2900 of FIG. 29 depicts the output voltage response of all three inverters for a step load change. Plot 3000 of FIG. 30 shows the inductor current response of all three inverters. The responses show that the damping characteristics are greatly enhanced and the system performance in terms of overshoots and settling time is improved significantly.

Figure 31:
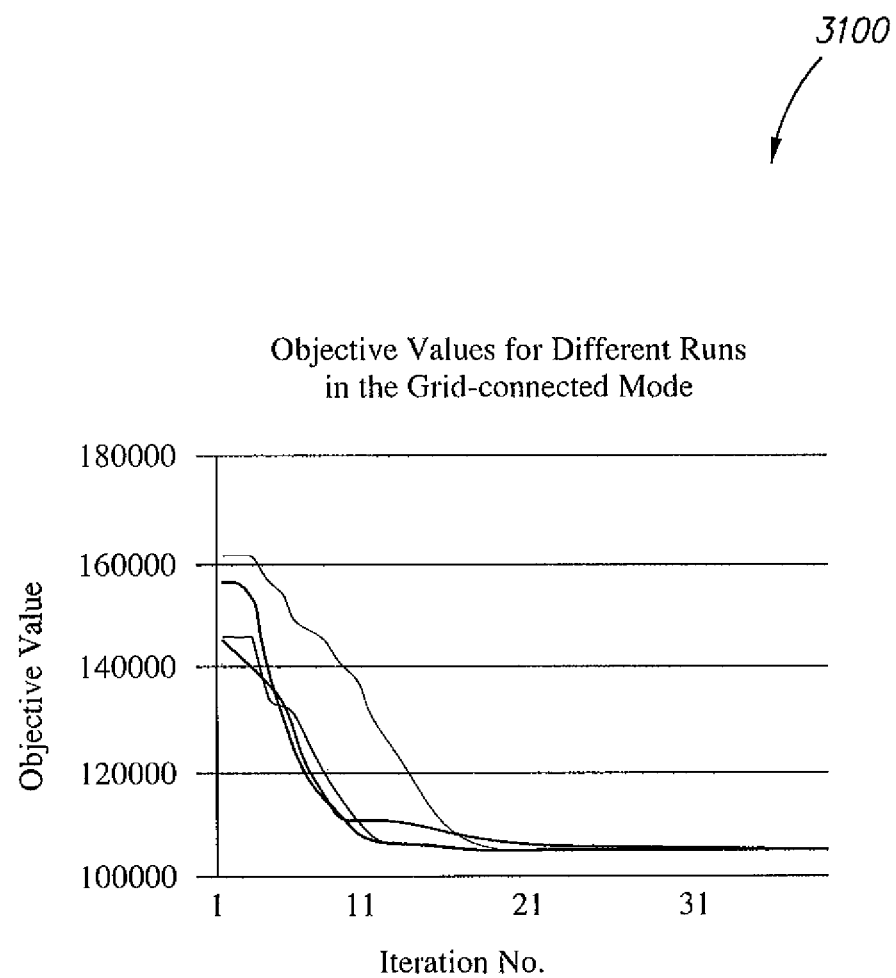
FIG. 31 is a plot showing objective function convergence in the grid-connected mode.
Figure 32:
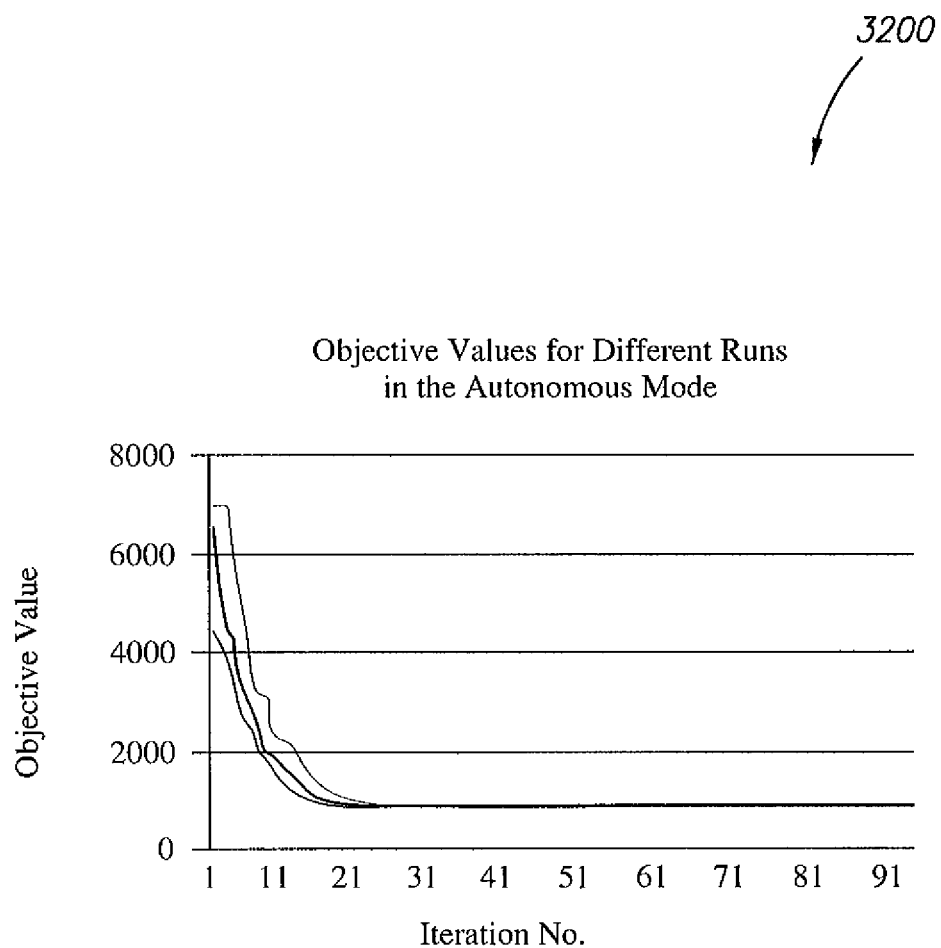
FIG. 32 is a plot showing objective function convergence in the autonomous mode.

To demonstrate the effectiveness and to assess the robustness of the proposed controller under different conditions, several particle swarm optimization runs have been carried out in both modes with different initial populations. The convergence of the objective function is shown in plots 3100 and 3200 of FIGS. 31 and 32 for grid-connected mode and autonomous mode, respectively. It can be seen that the objective function reaches the same value in all runs. This confirms the robustness of the particle swarm optimization method for microgrids with respect to the method's initial guess and subsequent capability to avoid getting trapped in local minima.

Linear and nonlinear models of a microgrid operating in grid-connected and autonomous modes have been presented herein. The design of different controllers, filter, and power sharing coefficients has been formulated as an optimization problem. Two different objective functions to enhance the system stability have been developed. The PSO technique is employed to search for the optimal settings of the optimized parameters. Different disturbances have been applied to demonstrate the effectiveness of the design approach. In the grid-connected mode, the step change in the reference power has been used to test the system capability to follow this reference power. System stability has been analyzed using both nonlinear time domain simulations and eigenvalue analysis. In the autonomous mode, step change and fault disturbances have been used to verify system stability. The results confirm the effectiveness of the particle swarm optimization method for microgrids with respect to optimizing the parameters of PI controllers, filter, and power sharing coefficients, which achieve satisfactory system performance under different disturbances. The robustness of the particle swarm optimization method for microgrids with respect to its initial estimation has been also confirmed.

It is to be understood that the present invention is not limited to the embodiments described above, but encompasses any and all embodiments within the scope of the following claims.

We claim:

1. A particle swarm optimization method for a microgrid providing stability enhancement to the microgrid in a grid-connected mode when the microgrid is connected to a grid power supply and in an autonomous mode when the microgrid is disconnected from the grid power supply, the method comprising the steps of:
    (a) calculating an LC filter and coupling inductor reference current representing output reactive and active reference power components, the filter and coupling inductor being connected between the microgrid and the grid power supply when in the grid-connected mode, the filter and coupling inductor being connected between the microgrid and a load when in the autonomous mode;
    (b) minimizing error in the filter and coupling inductor current with respect to the reference current of the filter and coupling inductor;

(c) providing a reference angle for a rotating current control reference frame;
(d) controlling current of the microgrid using the rotating current control reference frame, the current controlling step being based on the current control reference frame reference angle;
(e) controlling power of the microgrid utilizing three phase (abc) and direct quadrature (dq) calculations of the reference currents, the microgrid having a power controller outputting a modified direct current available at the LC filter and coupling inductor and a modified quadrature current available at the LC filter and coupling inductor;
(f) providing a small signal model characterizing the LC filter and coupling inductor;
(g) optimizing inductive and capacitive values of the LC filter and coupling inductor connected between the microgrid and the grid power supply when the microgrid is in the grid-connected mode, the filter optimization being performed by a particle swarm optimization procedure utilizing the small signal model characterizing the LC filter and coupling inductor;
(h) optimizing inductive and capacitive values of the LC filter and coupling inductor connected between the microgrid and a load when the microgrid is in the autonomous mode, the filter optimization being performed by a particle swarm optimization procedure utilizing the small signal model characterizing the LC filter and coupling inductor; and
(i) outputting a modified system angle control signal, system frequency control signal, and a system current control signal to phase control, frequency control, and system current control circuits of a microgrid power source, 2. The particle swarm optimization method for a microgrid according to claim 1, wherein:
step (g) further comprises optimizing $k_p^d$, $k_i^d$, $k_p^q$, $k_i^q$, $L_f$, $C_f$, and $R_d$ parameters subject to constraints $k_p^{d\ min} \leq k_p^d \leq k_p^{d\ max}$, $k_i^{d\ min} \leq k_i^d \leq k_i^{d\ max}$, $k_p^{q\ min} \leq k_p^q \leq k_p^{q\ max}$, $k_i^{q\ min} \leq k_i^q \leq k_i^{q\ max}$, $L_f^{min} \leq L_f \leq L_f^{max}$, $C_f^{min} \leq C_f \leq C_f^{max}$, $R_d^{min} \leq R_d \leq R_d^{max}$ when the microgrid is operated in grid-connected mode, where $k_p^d$ is a direct inductive current error proportional gain constant, $k_i^d$ is a direct inductive current error integral gain constant, $k_p^q$ is a quadrature inductive current error proportional gain constant, $k_i^q$ is a quadrature inductive current error integral gain constant, $L_f$ is a total filter inductance, $C_f$ is total filter capacitance, and $R_d$ is a ground return resistance; and
said step (g) uses an objective function for performing the optimizing, the objective function being minimized in order to optimize the optimizing parameters.

3. The particle swarm optimization method for a microgrid according to claim 2, wherein said objective function comprises a linear model objective function, the linear model objective function being $J_{linear\_model} = \max\{Real(\lambda_i)\}$.

4. The particle swarm optimization method for a microgrid according to claim 2, wherein said objective function comprises a nonlinear model objective function, the nonlinear model objective function being $J_{nonlinear\_model} = \min\{P_{measured} - P_{reference}\}^2$.

5. The particle swarm optimization method for a microgrid according to claim 1, wherein:
step (h) further comprises optimizing said $k_p^d$, $k_i^d$, $k_p^q$, $k_i^q$, $L_f$, $C_f$, and $R_d$ parameters subject to constraints $k_{pv}^{min} \leq k_{pv} \leq k_{pv}^{max}$, $k_{iv}^{min} \leq k_{iv} \leq k_{iv}^{max}$, $k_{pc}^{min} \leq k_{pc} \leq k_{pc}^{max}$, $m_p^{min} \leq m_p \leq m_p^{max}$, $n_q^{min} \leq n_q \leq n_q^{max}$ when the microgrid is operated in autonomous mode, where $k_{pv}$ is a voltage controller proportional gain constant, $k_{iv}$ is a voltage controller integral gain constant, $k_{pc}$ is a current controller proportional gain constant, $m_p$ is an active power droop characteristic, and $n_q$ is a reactive power droop characteristic; and
said step (h) uses an objective function for performing the optimizing, the objective function being minimized in order to optimize the optimizing parameters.

6. The particle swarm optimization method for a microgrid according to claim 5, wherein said objective function comprises a linear model objective function, the linear model objective function being $J_{linear\_model} = \max\{Real(\lambda_i)\}$.

7. The particle swarm optimization method for a microgrid according to claim 5, wherein said objective function comprises a nonlinear model objective function, the nonlinear model objective function being $J_{nonlinear\_model} = \min\{P_{measured} - P_{reference}\}^2$.

8. A particle swarm optimization system for a microgrid, comprising:
means for calculating an LC filter and coupling inductor reference current representing output reactive and active reference power components, the filter and coupling inductor being connected between the microgrid and a power grid when operated in grid-connected mode, the LC filter and coupling inductor being connected between the microgrid and a load when operated in autonomous mode;
means for minimizing error in the current of the filter and coupling inductor with respect to the reference current of the filter and coupling inductor;
means for providing a reference angle for a rotating current control reference frame;
means for controlling current of the microgrid using the rotating current control reference frame, the current controlling being based on the current control reference frame reference angle;
means for controlling power of the microgrid utilizing three-phase (abc) and direct quadrature (dq) calculations of the reference currents, the means for controlling power outputting a modified direct current available at the LC filter and coupling inductor and a modified quadrature current available at the LC filter and coupling inductor;
means for providing a small signal model characterizing the LC filter and coupling inductor;
means for optimizing inductive and capacitive values of the LC filter and coupling inductor connected between the microgrid and the conventional grid power supply when the microgrid is in grid-connected mode, the filter optimization being performed by a particle swarm optimization procedure utilizing the small signal model characterizing the LC filter and coupling inductor;
means for optimizing inductive and capacitive values of the LC filter and coupling inductor connected between the microgrid and a load when the microgrid is in autonomous mode, the filter optimization being performed by a particle swarm optimization procedure utilizing the small signal model characterizing the LC filter and coupling inductor; and
means for outputting a modified system angle control signal, a system frequency control signal, and a system current control signal to phase control, frequency control, and system current control circuits of a microgrid power source.

9. The particle swarm optimization system for a microgrid according to claim 8, further comprising:
means for optimizing $k_p^d$, $k_i^d$, $k_p^q$, $k_i^q$, $L_f$, $C_f$ and $R_d$ parameters subject to constraints $k_p^{d\ min} \leq k_p^d \leq k_p^{d\ max}$, $k_i^{d\ min} \leq k_i^d \leq k_i^{d\ max}$, $k_p^{q\ min} \leq k_p^q \leq k_p^{q\ max}$, $k_i^{q\ min} \leq k_i^q \leq k_i^{q\ max}$, $L_f^{min} \leq L_f \leq L_f^{max}$, $C_f^{min} \leq C_f \leq C_f^{max}$, $R_d^{min} \leq R_d \leq R_d^{max}$ when the microgrid is in grid-connected mode, where $k_p^d$ is a direct inductive current error proportional gain constant, $k_i^d$ is a direct inductive current error integral gain constant, $k_p^q$ is a quadrature inductive current error proportional gain constant, $k_i^q$ is a quadrature inductive current error integral gain constant, $L_f$ is a total filter inductance, $C_f$ is total filter capacitance, and $R_d$ is a ground return resistance;

means for optimizing $k_p^d$, $k_i^d$, $k_p^q$, $k_i^q$, $L_f$, $C_f$, and $R_d$ parameters subject to constraints $k_{pv}^{min} \leq k_{pv} \leq k_{pv}^{max}$, $k_{iv}^{min} \leq k_{iv} \leq k_{iv}^{max}$, $k_{pc}^{min} \leq k_{pc} \leq k_{pc}^{max}$, $m_p^{min} \leq m_p \leq m_p^{max}$, $n_q^{min} \leq n_q \leq n_q^{max}$ when the microgrid is in autonomous mode, where $k_{pv}$ is a voltage controller proportional gain constant, $k_{iv}$ is a voltage controller integral gain constant, $k_{pc}$ is a current controller proportional gain constant, $m_p$ is an active power droop characteristic, and $n_q$ is a reactive power droop characteristic;

means for selecting an objective function from linear and nonlinear models, the linear model objective function being $J_{linear\_model} = \max\{\text{Real}(\lambda_i)\}$, the nonlinear model objective function being $J_{nonlinear\_model} = \min\{P_{measured} - P_{reference}\}^2$; and means for minimizing the objective function to optimize the optimizing parameters.

10. A computer software product, comprising a non-transitory storage medium readable by a processor, the non-transitory storage medium having stored thereon a set of instructions for performing a particle swarm optimization method for a microgrid providing stability enhancement to the microgrid in a grid-connected mode when the microgrid is connected to a grid power supply and in an autonomous mode when the microgrid is disconnected from the grid power supply, the set of instructions including:

(a) a first sequence of instructions which, when executed by the processor, causes said processor to calculate an LC filter and coupling inductor reference current representing output reactive and active reference power components, the filter and coupling inductor being connected between the microgrid and the power grid when operated in grid-connected mode, said LC filter and coupling inductor being connected between said micro grid and a load when operated in autonomous mode;

(b) a second sequence of instructions which, when executed by the processor, causes said processor to minimize error in the current of the filter and coupling inductor with respect to the reference current of the filter and coupling inductor;

(c) a third sequence of instructions which, when executed by the processor, causes said processor to provide a reference angle for a rotating current control reference frame;

(d) a fourth sequence of instructions which, when executed by the processor, causes said processor to control current of the microgrid using the rotating current control reference frame, the current control being based on the current control reference frame reference angle;

(e) a fifth sequence of instructions which, when executed by the processor, causes said processor to control power of the microgrid utilizing three-phase (abc) and direct quadrature (dq) calculations of the reference currents, the micro grid having a power controller outputting a modified direct current available at the LC filter and coupling inductor and a modified quadrature current available at the LC filter and coupling inductor;

(f) a sixth sequence of instructions which, when executed by the processor, causes said processor to provide a small signal model characterizing the LC filter and coupling inductor;

(g) a seventh sequence of instructions which, when executed by the processor, causes said processor to optimize inductive and capacitive values of the LC filter and coupling inductor connected between the micro grid and the grid power supply when the microgrid is operated in grid-connected mode, the filter optimization being performed by a particle swarm optimization procedure utilizing the small signal model characterizing the LC filter and coupling inductor;

(h) a eighth sequence of instructions which, when executed by the processor, causes said processor to optimize inductive and capacitive values of the LC filter and coupling inductor connected between the microgrid and a load when the microgrid is operated in autonomous mode, the filter optimization being performed by a particle swarm optimization procedure utilizing the small signal model characterizing the LC filter and coupling inductor; and (i) a ninth sequence of instructions which, when executed by the processor, causes said processor to output a modified system angle control signal, a system frequency control signal, and a system current control signal to phase control, frequency control, and system current control circuits of a microgrid power source.

11. The computer software product for a microgrid according to claim 10, wherein said particle swarm optimization sequence of instructions further comprises:

(j) a tenth sequence of instructions which, when executed by the processor, causes said processor to optimize $k_p^d$, $k_i^d$, $k_p^q$, $k_i^q$, $L_f$, $C_f$, and $R_d$ parameters subject to constraints $k_p^{d\ min} \leq k_p^d \leq k_p^{d\ max}$, $k_i^{d\ min} \leq k_i^d \leq k_i^{d\ max}$, $k_p^{q\ min} \leq k_p^q \leq k_p^{q\ max}$, $k_i^{q\ min} \leq k_i^q \leq k_i^{q\ max}$, $L_f^{min} \leq L_f \leq L_f^{max}$, $C_f^{min} \leq C_f \leq C_f^{max}$, $R_d^{min} \leq R_d \leq R_d^{max}$ when the micro grid is operated in grid-connected mode, where $k_p^d$ is a direct inductive current error proportional gain constant, $k_i^d$ is a direct inductive current error integral gain constant, $k_p^q$ is a quadrature inductive current error proportional gain constant, $k_i^q$ is a quadrature inductive current error integral gain constant, $L_f$ is a total filter inductance, $C_f$ is total filter capacitance, and $R_d$ is a ground return resistance;

(k) a eleventh sequence of instructions which, when executed by the processor, causes said processor to optimize $k_p^d$, $k_i^d$, $k_p^q$, $k_i^q$, $L_f$, $C_f$, and $R_d$ parameters subject to constraints $k_{pv}^{min} \leq k_{pv} \leq k_{pv}^{max}$, $k_{iv}^{min} \leq k_{iv} \leq k_{iv}^{max}$, $k_{pc}^{min} \leq k_{pc} \leq k_{pc}^{max}$, $m_p^{min} \leq m_p \leq m_p^{max}$, $n_q^{min} \leq n_q \leq n_q^{max}$ when the microgrid is operated in autonomous mode, where $k_{pv}$ is a voltage controller proportional gain constant, $k_{iv}$ is a voltage controller integral gain constant, $k_{pc}$ is a current controller proportional gain constant, $m_p$ is an active power droop characteristic, and $n_q$ is a reactive power droop characteristic;

(l) a twelfth sequence of instructions which, when executed by the processor, causes said processor to use an objective function selected from linear and nonlinear models, the linear model objective function being $J_{linear\_model} = \max\{\text{Real}(\lambda_i)\}$, the nonlinear model objective function being $J_{nonlinear\_model} = \min\{P_{measured} - P_{reference}\}^2$;

(m) a thirteenth sequence of instructions which, when executed by the processor, causes said processor to minimize the objective function to optimize the optimizing parameters.

* * * * *